US 10,175,839 B2

(12) United States Patent
Srivastava et al.

(10) Patent No.: US 10,175,839 B2
(45) Date of Patent: Jan. 8, 2019

(54) HIGHLY CONFIGURABLE FRONT END FOR TOUCH CONTROLLERS

(71) Applicant: QUALCOMM Incorporated, San Diego, CA (US)

(72) Inventors: Ankit Srivastava, San Diego, CA (US); Mohamed Imtiaz Ahmed, San Marcos, CA (US); Dustin Tarl Dunwell, Toronto (CA); William Martin Snelgrove, Toronto (CA); Ayaz Hasan, Milton (CA); Matthew David James, Guelph (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/470,731

(22) Filed: Mar. 27, 2017

(65) Prior Publication Data

US 2018/0188847 A1    Jul. 5, 2018

Related U.S. Application Data

(60) Provisional application No. 62/441,000, filed on Dec. 30, 2016.

(51) Int. Cl.
*G06F 3/041*    (2006.01)
*G06F 3/044*    (2006.01)

(52) U.S. Cl.
CPC ............ *G06F 3/044* (2013.01); *G06F 3/0412* (2013.01); *G06F 3/0416* (2013.01); *G06F 3/041* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 8,810,543 B1 * | 8/2014 | Kurikawa | ............ G06F 3/0416 178/18.06 |
| 9,104,273 B1 | 8/2015 | Olson et al. | |
| 9,110,581 B2 | 8/2015 | Momchilov | |

(Continued)

FOREIGN PATENT DOCUMENTS

| | | |
|---|---|---|
| EP | 3026533 A1 | 6/2016 |
| WO | 2016131010 A1 | 8/2016 |

OTHER PUBLICATIONS

International Search Report and Written Opinion—PCT/US2017/068870—ISA/EPO—dated Apr. 3, 2018.

*Primary Examiner* — Ryan A Lubit
(74) *Attorney, Agent, or Firm* — Qualcomm Incorporated

(57) ABSTRACT

In some aspects of the present disclosure, a method for touch-panel processing is provided. The method includes receiving a plurality of sensor signals from a touch panel, wherein each one of the plurality of sensor signals corresponds to a respective one of a plurality of channels of the touch panel. The method also includes, for each one of the received sensor signals, converting the received sensor signal into one or more respective digital values. The method further includes, for each one of the received sensor signals, performing digital processing on the one or more respective digital values using a respective one of a plurality of processing engines to generate one or more respective processed digital values. The method further includes performing additional processing on the processed digital values.

20 Claims, 17 Drawing Sheets

(56) References Cited

U.S. PATENT DOCUMENTS

| | | | |
|---|---|---|---|
| 9,213,052 B2 | 12/2015 | Wilson et al. | |
| 9,348,470 B2 | 5/2016 | Brown et al. | |
| 9,367,184 B2 | 6/2016 | Kobayashi et al. | |
| 2011/0063993 A1* | 3/2011 | Wilson | G06F 3/044 370/254 |
| 2013/0038570 A1* | 2/2013 | Seo | G06F 3/0416 345/174 |
| 2013/0120171 A1 | 5/2013 | Dinc et al. | |
| 2013/0176269 A1* | 7/2013 | Sobel | G06F 3/044 345/174 |
| 2013/0249825 A1 | 9/2013 | Kang et al. | |
| 2013/0285972 A1 | 10/2013 | Elias et al. | |
| 2014/0152612 A1* | 6/2014 | Choi | G06F 3/044 345/174 |
| 2014/0327630 A1 | 11/2014 | Burr et al. | |
| 2015/0022494 A1* | 1/2015 | Azumi | G06F 3/044 345/174 |
| 2015/0067540 A1 | 3/2015 | Yang et al. | |
| 2015/0145801 A1 | 5/2015 | Angelini et al. | |
| 2015/0185913 A1* | 7/2015 | Han | G06F 3/044 345/174 |
| 2015/0212643 A1 | 7/2015 | Lee et al. | |
| 2015/0277660 A1 | 10/2015 | Yang et al. | |
| 2015/0280668 A1 | 10/2015 | Huang et al. | |
| 2016/0147319 A1* | 5/2016 | Agarwal | G06F 3/0418 345/173 |
| 2016/0147376 A1 | 5/2016 | Kim et al. | |
| 2016/0313845 A1* | 10/2016 | Lin | G06F 3/0418 |
| 2017/0262092 A1* | 9/2017 | Wu | G06F 3/044 |
| 2018/0032176 A1 | 2/2018 | Krah et al. | |
| 2018/0188846 A1 | 7/2018 | Srivastava et al. | |

\* cited by examiner

HIGHLY CONFIGURABLE FRONT END FOR TOUCH CONTROLLERS

RELATED APPLICATION

This application claims priority under 35 U.S.C. § 119(e) to U.S. Provisional Application No. 62/441,000 filed on Dec. 30, 2016, the entire specification of which is incorporated herein by reference.

BACKGROUND

Field

Aspects of the present disclosure relate generally to touch panels, and more particularly, to configurable touch-panel interfaces.

Background

A touch panel (also referred to as a touch screen) includes a grid (array) of touch sensors overlaid on a display. The touch sensors may employ capacitive sensing, in which a user's finger is detected by detecting changes in the capacitances (e.g., mutual capacitances and/or self capacitances) of the sensors caused by the user's finger.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A first aspect relates to a system. The system includes a plurality of processing engines, wherein each one of the plurality of processing engines is configured to receive one or more respective digital values corresponding to a respective sensor signal from a touch panel, and to perform digital processing on the one or more respective digital values to generate one or more respective processed digital values. The system also includes a controller configured to program each one of the plurality of processing engines to perform the digital processing, and a processor configured to receive the processed digital values from the plurality of processing engines, and to perform additional processing on the received processed digital values.

A second aspect relates to a method for touch-panel processing. The method includes receiving a plurality of sensor signals from a touch panel, wherein each one of the plurality of sensor signals corresponds to a respective one of a plurality of channels of the touch panel. The method also includes, for each one of the received sensor signals, converting the received sensor signal into one or more respective digital values. The method further includes, for each one of the received sensor signals, performing digital processing on the one or more respective digital values using a respective one of a plurality of processing engines to generate one or more respective processed digital values. The method further includes performing additional processing on the processed digital values.

To the accomplishment of the foregoing and related ends, the one or more embodiments include the features herein-after fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A touch panel (also referred to as a touch screen) includes a grid (array) of touch sensors overlaid on a display. The touch sensors may employ capacitive sensing, in which a user's finger is detected by detecting changes in the capacitances (e.g., mutual capacitances and/or self capacitances) of the sensors caused by the user's finger.

A touch panel is typically interfaced to a host processor via an interface. The interface may include an analog front end and a digital back end. The analog front end is configured to drive the touch sensors, receive signals from the touch sensors, and perform analog operations on the signals (e.g., amplification). The output signals of the analog front end are converted into digital signals by analog-to-digital converters (ADCs), which are input to the digital back end. The digital back end performs digital operations on the digital signals, and outputs the resulting signals to the host processor (e.g., a processor on a mobile device incorporating the touch panel).

A configurable interface that can be programmed to interface with different touch panel designs is desirable. This would allow the interface to be used with different touch panel designs instead of having to develop a custom interface for each touch panel design, thereby reducing development costs.

Figure 1:
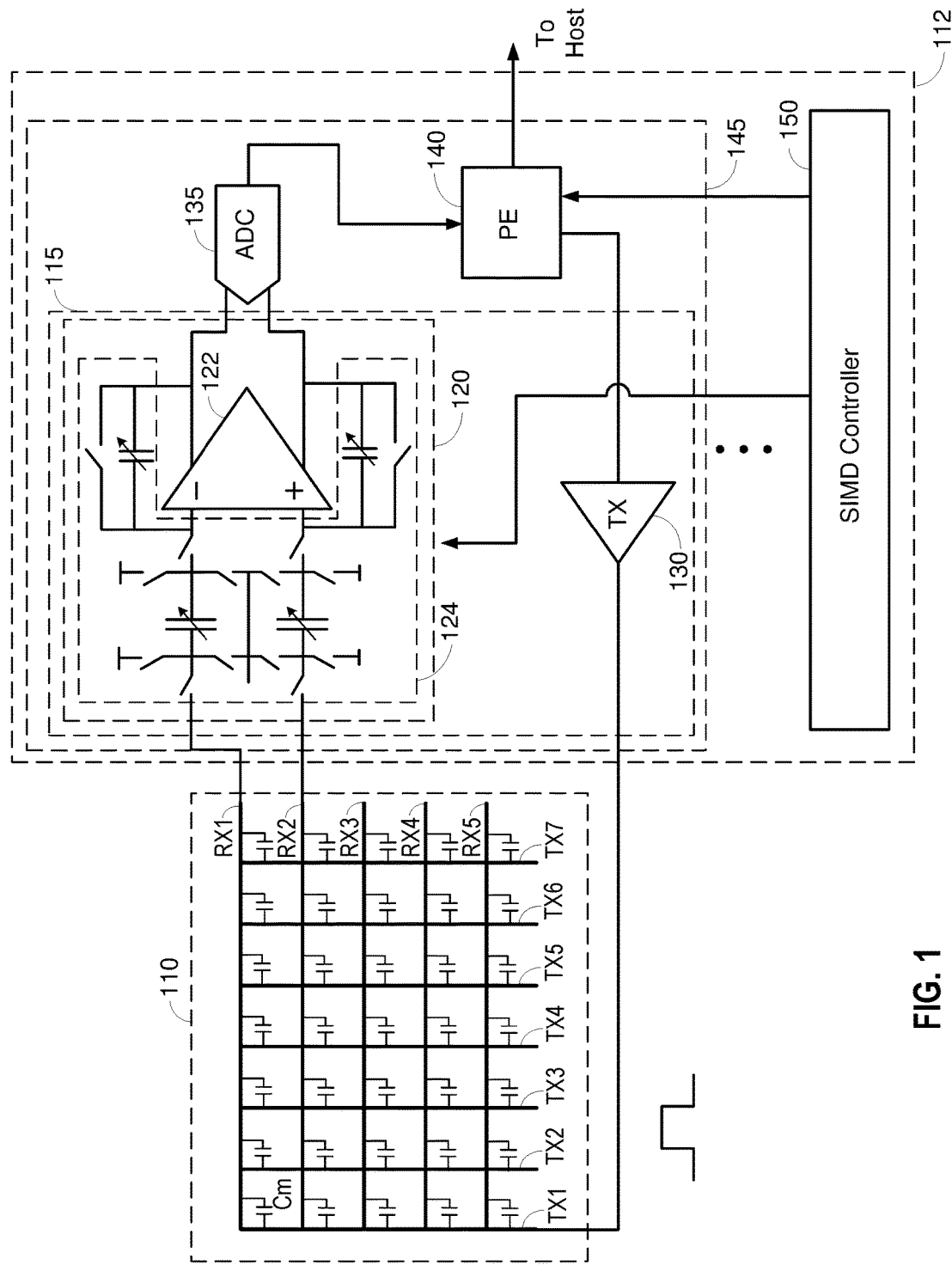
FIG. 1 shows an example of a touch panel and a configurable interface for the touch panel according to certain aspects of the present disclosure.

In this regard, FIG. 1 shows an example of a configurable (programmable) interface 112 that interfaces a touch panel 110 with a host processor (not shown) according to certain aspects of the present disclosure. The touch panel 110 includes multiple transmission lines Tx1 to Tx7 and multiple receive lines Rx1 to Rx5, in which the receive lines Rx1 to Rx5 may be arranged approximately perpendicular to the transmission lines Tx1 to Tx7. The mutual capacitance between each transmission line and each receive line forms a touch sensor on the touch panel 110. Each of the touch sensors is depicted as a mutual capacitor (denoted "Cm") in FIG. 1. In this example, a user's finger may be detected by detecting changes in the mutual capacitances of one or more of the touch sensors caused by the user's finger, as discussed further below. It is to be appreciated that the number of transmission lines and receive lines shown in FIG. 1 is exemplary, and that the number of transmission lines and receive lines may vary depending on, for example, display screen size.

The interface 112 includes multiple slices 145, in which each slice may include an analog front end 115, an analog-to-digital converter (ADC) 135, and a processing engine PE 140. For simplicity, only one slice 145 is shown in FIG. 1.

The analog front end 115 of each slice 145 may include a receiver 120 and a transmitter 130. The receiver 120 includes an amplifier 122 and a switch capacitor network 124 made up of switches and capacitors. The receiver 120 is configured to receive sensor signals from one or two of the receive lines of the touch panel 110 (also referred to as a channel). The transmitter 130 is configured to drive one or more of the transmission lines (e.g., with a square-wave signal, a sinusoidal signal or another type of signal).

The ADC 135 in each slice 145 converts the output signal of the respective receiver into a digital signal, which is input to the respective PE 140. The respective PE may include one or more programmable arithmetic logic units (ALUs) that perform digital processing on the respective digital signal. The digital processing may include one or more of Fast Fourier Transform (FFT), demodulation, filtering, averaging, Walsh decoding, baseline subtraction, etc. The resulting signal is output to the host processor (e.g., a processor on a mobile device incorporating the touch panel). The PE 140 may also digitally process signals for driving one or more of the transmission lines on the touch panel 110 using the respective transmitter 130.

The interface 112 includes a single instruction multiple data (SIMD) controller 150 for controlling both the analog front ends 115 and the PEs 140 of the slices 145. For example, the SIMD controller 150 may control the receivers 120 in multiple slices according to a single instruction to perform the same analog processing on the respective sensor signals in parallel. In this example, the SIMD controller 150 may control the switching sequence of the switches in the switch capacitor networks 124 of the receivers 120 to perform desired operations, as discussed further below. The SIMD controller 150 may configure the receivers to operate in any one of a variety of different receiver modes (e.g., differential receiver mode, single-ended receiver mode, etc.) depending on the requirements of a particular touch panel design. The SIMD controller 150 may also select a subset of the receive channels of the touch panel by selecting the respective receivers.

The SIMD controller 150 controls (programs) the PEs 140 of the slices to perform one or more digital operations (FFTs, demodulation, etc.) on the respective digital signals. In this regard, each PE may be configured to perform anyone of a variety of different digital operations, and the SIMD controller 150 may configure one or more of the PEs to perform one or more of the digital operations depending on the requirements of a particular touch panel design and/or host processor.

Thus, the SIMD controller 150 controls both the analog front ends 115 and the PEs 140 of the slices of the interface 112, and allows the interface 112 to be programmed for interfacing with different touch panel designs. The SIMD controller 150 may be programmed through firmware to suit the touch panel requirements.

As discussed above, the SIMD controller 150 may configure the receivers 120 to operate in any one of multiple receiver modes (e.g., differential receiver mode, single-ended receiver mode, etc.). Examples of the receiver modes will now be described according to certain aspects of the present disclosure.

Figure 2:
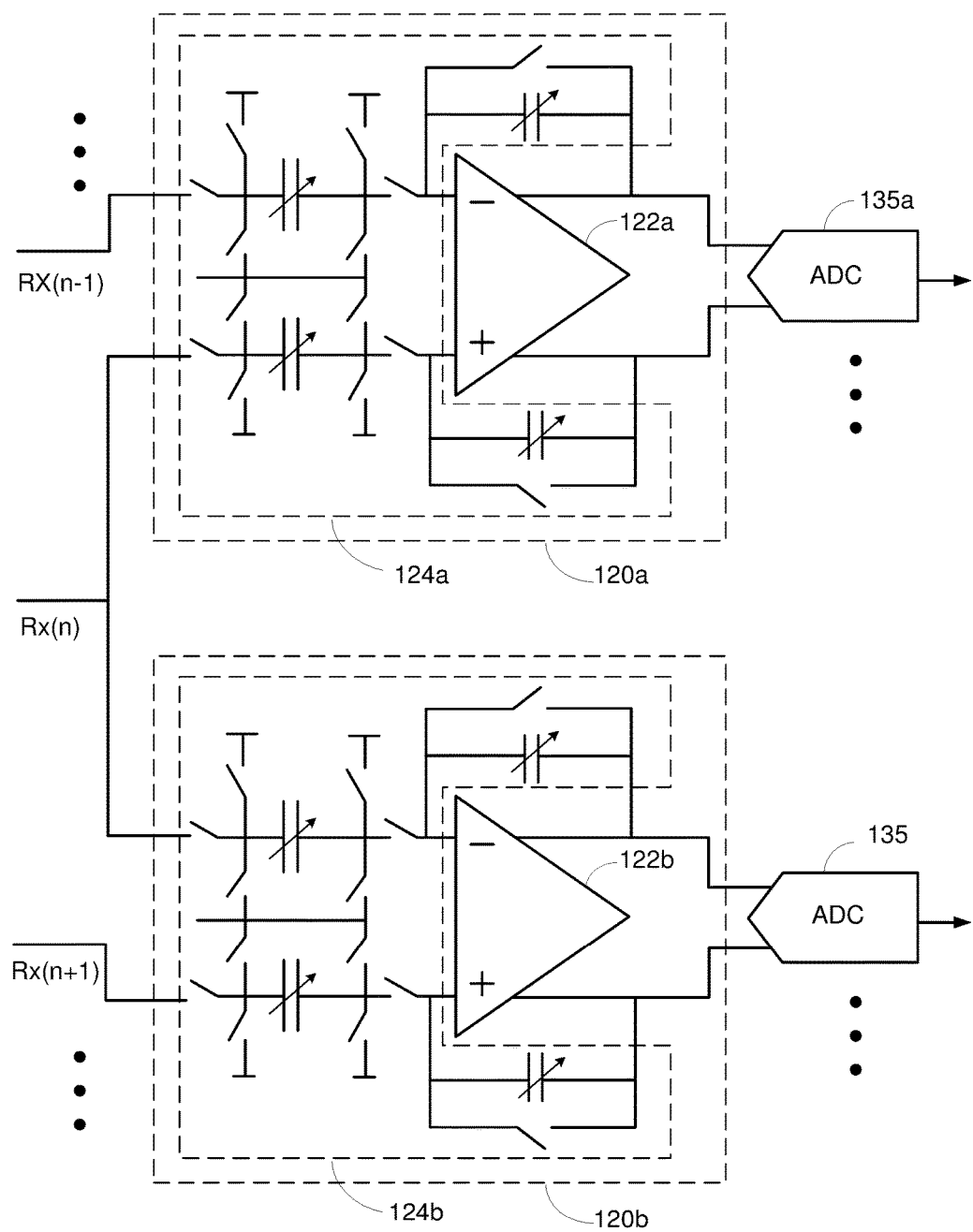
FIG. 2 shows an example of two adjacent configurable receivers in the interface according to certain aspects of the present disclosure.

FIG. 2 shows an example of two of the receivers. One of the receivers is denoted with the suffix "a" and the other receiver is denoted with the suffix "b". As shown in FIG. 2, each of the receivers 120a and 120b is coupled to two adjacent receive lines of the touch panel 110. In this example, receiver 120a is coupled to adjacent receive lines RX(n−1) and RX(n), and receiver 120b is coupled to adjacent receive lines RX(n) and RX(n+1). This allows the SIMD controller 150 to operate receiver 120a in a differential mode to measure the difference between the capacitances of two touch sensors on adjacent receive lines RX(n) and RX(n−1), and to operate receiver 120b in a differential mode to measure the difference between the capacitances of two touch sensors on adjacent receive lines RX(n) and RX(n+1). Although only two of the receivers are shown in FIG. 2 for ease of illustration, it is to be appreciated that each of the receivers in the interface may be coupled to two adjacent receive lines and operated in a differential mode. Operating the receivers 120a and 120b in a differential mode allows each receiver to cancel out noise (e.g., touch panel noise) that is common to both receive lines input to the receiver, as discussed further below.

Operation of receiver 120a in a differential mutual-capacitance sensing mode will now be discussed with reference to FIG. 3 according to certain aspects. It is to be appreciated that each of the other receivers may also be operated in the differential mutual-capacitance sensing mode in the manner discussed below.

Figure 3:
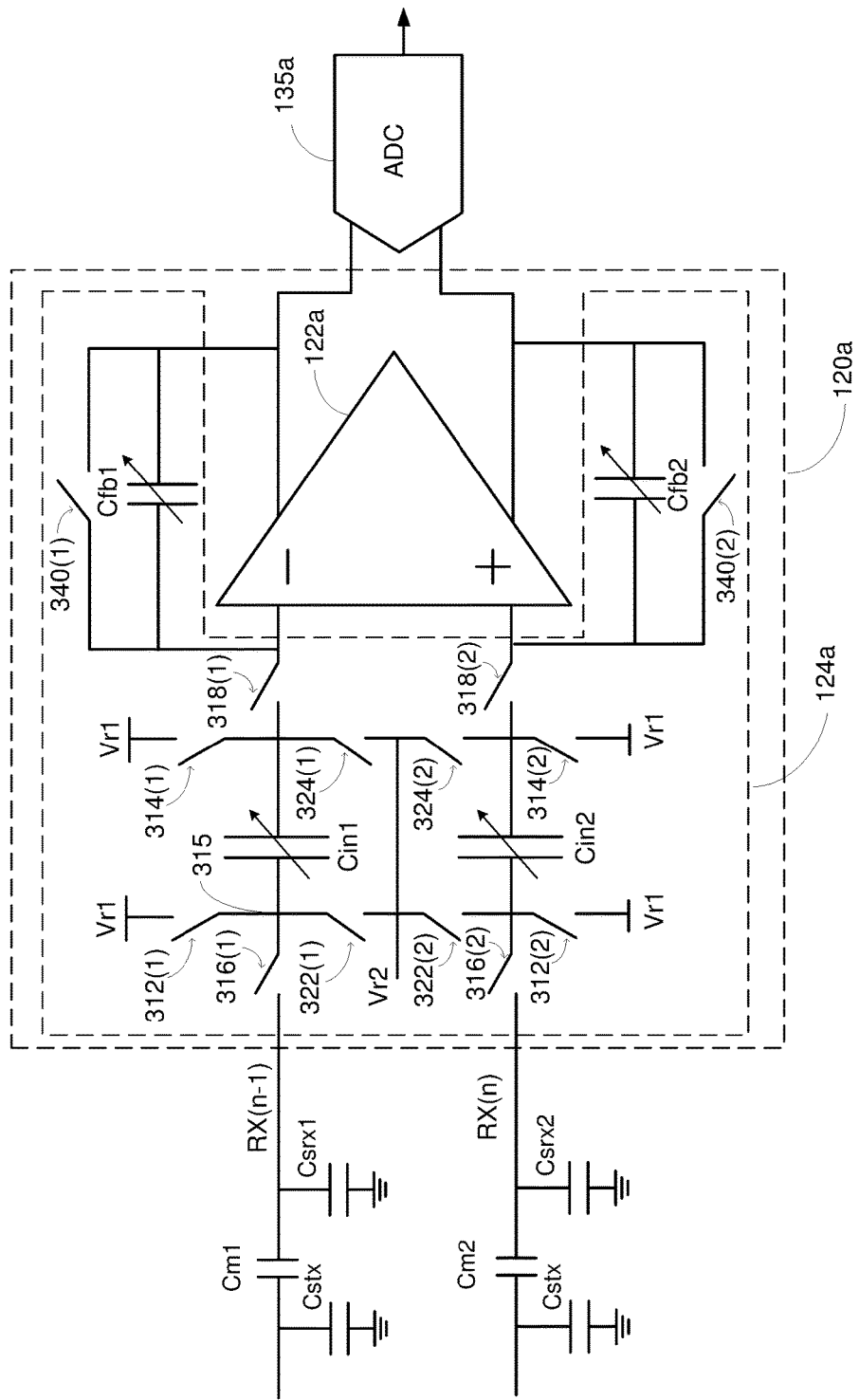
FIG. 3 shows an example of a configurable receiver including a switch capacitor network according to certain aspects of the present disclosure.

In the example shown in FIG. 3, the switch capacitor network 124a includes input capacitors Cin1 and Cin2 and feedback capacitors Cfb1 and Cfb2. As discussed further below, in the differential mode, input capacitor Cin1 is used to sample a voltage on receive line RX(n−1) and input capacitor Cin2 is used to sample a voltage on receive line RX(n). In this regard, each input capacitor may also be referred to as a sampling capacitor. Feedback capacitor Cfb1 is coupled between a first input of the amplifier 122a and a first output of the amplifier 122a, and feedback capacitor Cfb2 is coupled between a second input of the amplifier 122a and a second output of the amplifier 122a. In one example, the SIMD controller 150 may control switching of the switches in the switch capacitor network 124a so that the receiver functions as a switched capacitor differential amplifier.

In the example in FIG. 3, the mutual capacitance of one of the touch sensors on receive line RX(n−1) is modeled as mutual capacitor Cm1, and the mutual capacitance of one of the touch sensors on receive line RX(n) is modeled as mutual capacitor Cm2. FIG. 3 also shows the self capacitance of receive line RX(n−1) modeled as self capacitor Csrx1, and the self capacitance of receive line RX(n) modeled as self capacitor Csrx2. The self capacitances of the receive lines may come from capacitances between the receive lines and a ground plate. FIG. 3 also shows the self capacitance of the transmit line driving the touch sensors modeled as mutual capacitors Cm1 and Cm2. The self capacitance of the transmit line is modeled as self capacitor Cstx.

In operation, the SIMD controller 150 switches the switches in the switch capacitor network 124a according to a switching sequence that includes a sampling phase and a charge transfer phase. In both phases, switches 312(1), 314(1), 312(2) and 314(2) may be opened (turned off). As discussed further below, these switches may be used to operate the receiver 120a in other modes.

In the sampling phase, the controller 150 closes (turns on) switches 316(1), 316(2), 324(1) and 324(2), and opens (turns off) switches 322(1), 322(2), 318(1) and 318(2). This allows each of the input capacitors Cin1 and Cin2 to sample the voltage on the respective receive line, as discussed further below.

Figure 4A:
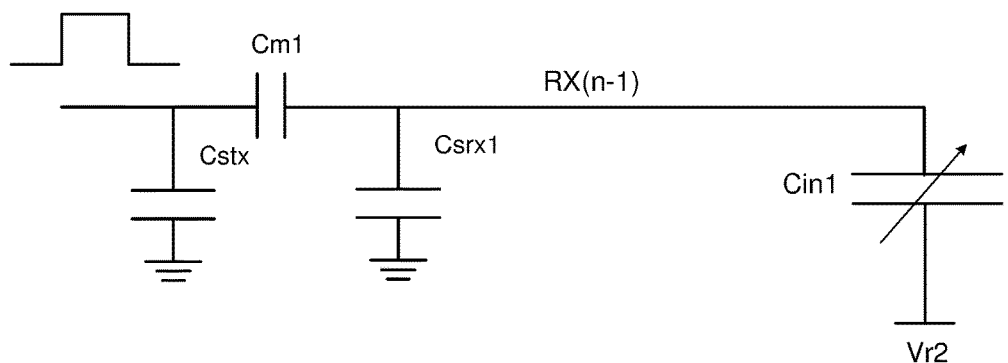
FIG. 4A shows an example of an input capacitor coupled to a receive line of the touch panel to sample a voltage on the receive line according to certain aspects of the present disclosure.

FIG. 4A shows the connection between input capacitor Cin1 and receive line RX(n−1) during the sampling phase. In this example, the touch sensor (modeled as mutual capacitor Cm) is driven with a square-wave signal by one of the transmitters 130 shown in FIG. 1. The mutual capacitor Cm1 and the receive line self capacitor Csrx1 form a capacitor voltage divider, in which a fraction of the voltage of the square-wave signal appears on the receive line self capacitor Csrx1. The voltage on the self capacitor Csrx1 depends on the capacitance of the mutual capacitor Cm and the capacitance of the self capacitor Csrx1. Typically, a user's finger decreases the capacitance of the mutual capacitor Cm1 by disturbing electric fields between the electrodes of the mutual capacitor Cm1. Since the presence of the user's finger affects the capacitance of the mutual capacitor Cm1, the presence of the user's finger also affects the voltage on the self capacitor Csrx1. Thus, the voltage on the self capacitor Csrx1 can be used to detect the presence of the user's finger.

Input capacitor Cin1 samples the voltage on the self capacitor Csrx1. Assuming the capacitance of input capacitor Cin1 is much smaller than the capacitance of the self capacitor Csrx1, input capacitor Cin1 may be charged to a voltage approximately equal to the voltage on the self capacitor Csrx1. In the example in FIG. 4, input capacitor Cin1 is coupled between receive line R(n−1) and a fixed reference voltage Vr2. Reference voltage Vr2 may be approximately equal to virtual ground or a DC reference voltage.

Input capacitor Cin2 samples the voltage on self capacitor Csrx2 in a similar manner. Therefore, a detailed discussion of input capacitor Cin2 during the sampling phase is omitted for brevity. During the sampling phase, the controller 150 may also close (turn on) switches 340(1) and 340(2) to reset the feedback capacitors Cfb1 and Cfb2.

Returning to FIG. 3, in the charge transfer phase, the controller 150 opens (turns off) switches 316(1), 316(2), 324(1), 324(2), 340(1) and 340(2) and closes (turns on) switches 322(1), 322(2), 318(1) and 318(2). This causes charge in each of the input capacitors Cin1 and Cin2 to transfer to the respective feedback capacitor Cfb1 and Cfb2, as discussed further below.

Figure 4B:
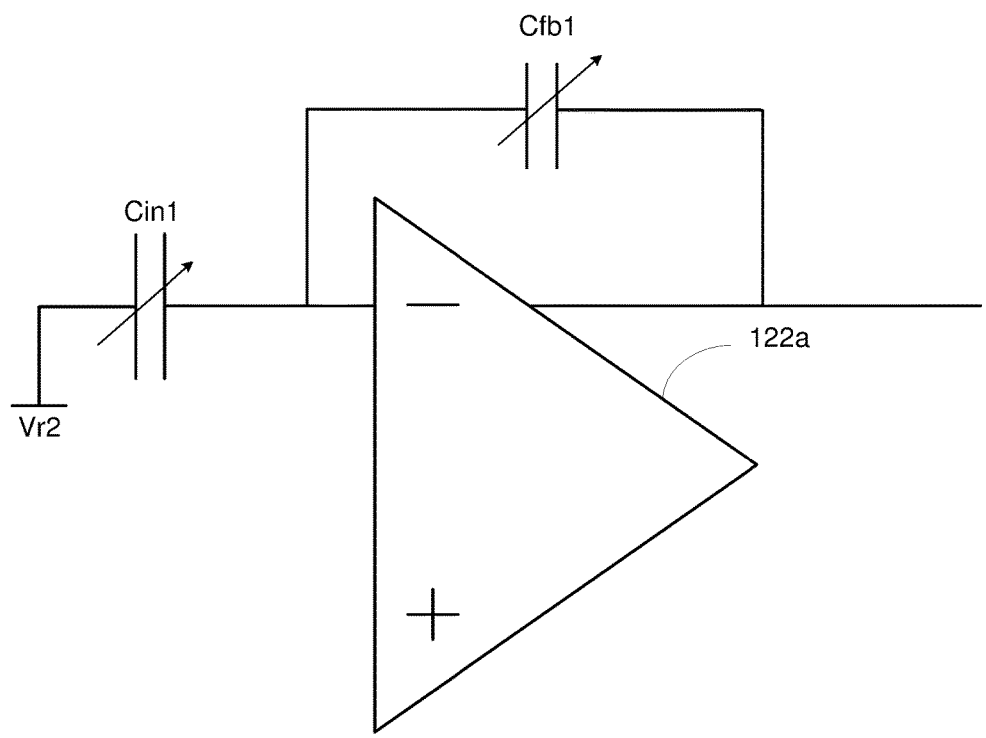
FIG. 4B shows an example of the input capacitor coupled to a feedback capacitor of an amplifier according to certain aspects of the present disclosure.

FIG. 4B show the connection between input capacitor Cin1 and feedback capacitor Cfb1 during the charge transfer phase. In this example, input capacitor Cin1 is coupled between reference voltage Vr2 and the first input of the amplifier 122a, and feedback capacitor Cfb1 is coupled between the first input of the amplifier 122a and the first output of the amplifier 122a. The charge transfer causes an output voltage to form on the first output of the amplifier 122a, in which the output voltage is a function of the voltage on the self capacitor Csrx1 sampled by input capacitor Cin1. Since the voltage on the self capacitor Csrx1 depends on the capacitance of mutual capacitor Cm1 (which is affected by the presence of the user's finger), the voltage at the first output of the amplifier 122a depends on the presence of the user's finger.

During the charge transfer phase, charge is also transferred from input capacitor Cin2 to feedback capacitor Cfb2 in a similar manner as the transfer of charge from input capacitor Cin1 to feedback capacitor Cfb1. This causes a voltage to form on the second output of the amplifier 122a, in which the output voltage is a function of the voltage on receive line self capacitor Csrx2 sampled by input capacitor Cin2. Since the voltage on the self capacitor Csrx2 depends on the capacitance of mutual capacitor Cm2 (which is affected by the presence of the user's finger), the voltage at the second output of the amplifier 122a depends on the presence of the user's finger.

Thus, the difference between the voltages at the first and second outputs of the amplifier 122a (i.e., the differential output voltage of the amplifier) is a function of the difference between the capacitances of mutual capacitors Cm1 and Cm2 (which model the mutual capacitances of adjacent touch sensors).

ADC 135a converts the differential output voltage of the amplifier 122a into a digital signal (digital code) representing the difference between the capacitances of the two adjacent touch sensors. The ADC 135a may output the digital signal (digital code) to the respective PE 140 for digital processing, as discussed further below.

The difference between the capacitances of the two adjacent touch sensors can be used to detect the presence of the user's finger. This is because the surface of the user's finger is curved, and therefore changes (affects) the mutual capacitances of the adjacent sensors by different amounts.

Operating the receiver 120a in the differential mode has the benefit of canceling out noise that is common to receive lines RX(n−1) and RX(n). The common noise may be due to noise generated by the display driver IC, human body self noise, etc. The cancelation of the common noise in the analog front end may eliminate the need for the respective PE 140 to execute computationally-intensive algorithms to filter out the noise in the digital domain.

The switching sequence may also include a reset phase to define the DC voltage on the touch panel 110 before the next transmission signal (e.g., transmission pulse). The reset phase may be performed after or concurrently with the charge transfer phase discussed above. During the reset phase, switches 312(1), 312(2), 316(1) and 316(2) may be turned on to short the respective receive lines to reference voltage Vr1. Switches 312(1), 312(2), 316(1) and 316(2) may then be turned off before the next transmission signal (e.g., transmission pulse). Alternatively, switches 322(1), 322(2), 316(1) and 316(2) may be turned on during the reset phase to short the respective lines to reference voltage Vr2. In this example, switches 322(1), 322(2), 316(1) and 316(2) may be turned off before the next transmission signal (e.g., transmission pulse). It is to be appreciated that other switches (not shown) different from the switches discussed above may be used to short the receive lines to reference voltage Vr1 or reference voltage Vr2 during the reset phase.

The gain of the receiver 120a may be given by the ratio of the capacitance of the input capacitors over the capacitance of the feedback capacitors. In the example in FIG. 3, each of the input capacitors Cin1 and Cin2 is implemented with a variable capacitor and each of the feedback capacitors Cfb1 and Cfb2 is implemented with a variable capacitor. This allows the controller 150 to adjust the gain of the receiver 120a by adjusting the capacitances of the input capacitors Cin1 and Cin2 and/or the capacitances of the feedback capacitors Cfb1 and Cfb2 according to a desired gain.

Figure 5:
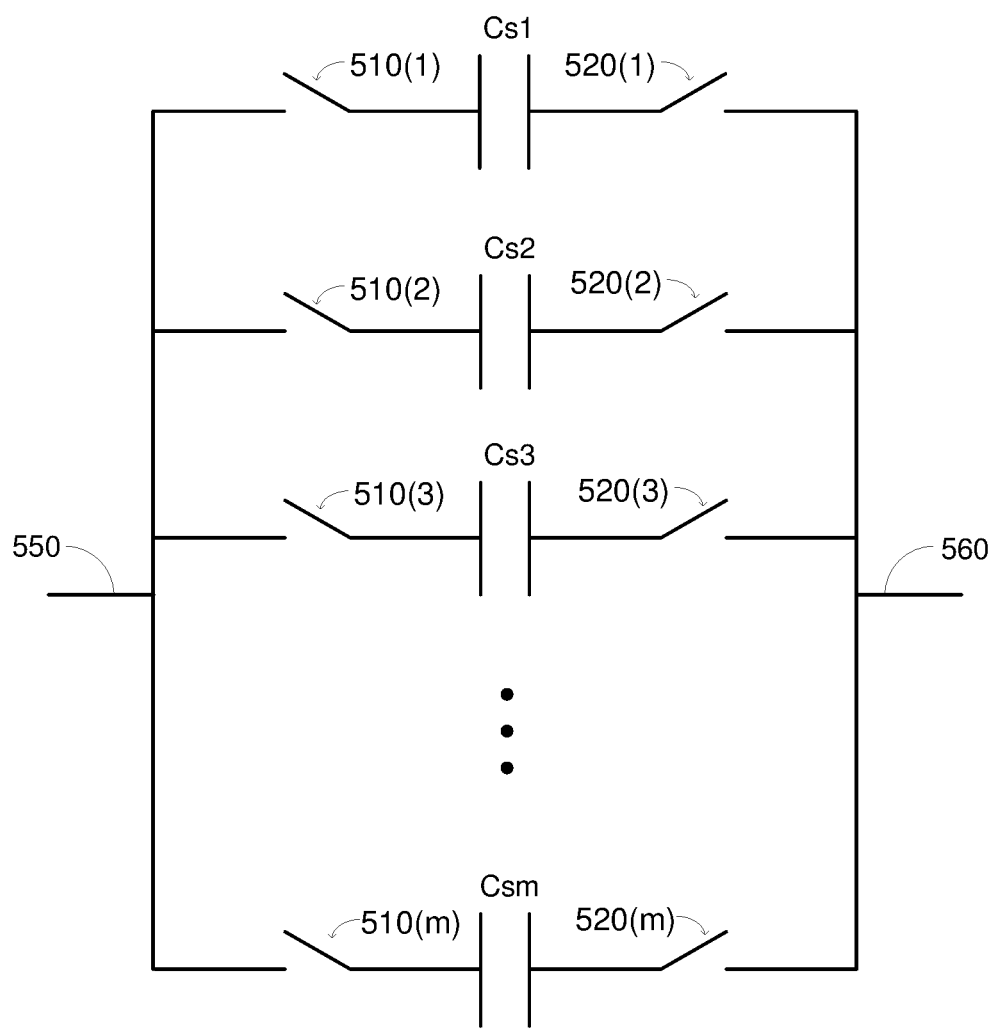
FIG. 5 shows an example of a switchable capacitor bank according to certain aspects of the present disclosure.

In certain aspects, each of the input capacitors Cin1 and Cin2 may be implemented with a switchable capacitor bank 505, an example of which is shown in FIG. 5. In this example, the capacitor bank 505 includes multiple capacitors Cs1 to Csm arranged in parallel, a first set of control switches 510(1) to 510(m), and a second set of control switches 520(1) to 520(m). The capacitor bank 505 also includes a first terminal 550 and a second terminal 560. Each control switch in the first set of control switches 510(1) to 510(m) is coupled between a respective one of the capacitors Cs1 to Csm and the first terminal 550, and each control switch in the second set of control switches 520(1) to 520(m) is coupled between a respective one of the capacitors Cs1 to Csm and the second terminal 560.

Each of the capacitors Cs1 to Csm is coupled between the first and second terminals 550 and 560 when the respective pair of control switches is turned on, and decoupled from the first and second terminals 550 and 560 when the respective pair of control switches is turned off. For example, capacitor Cs1 is coupled between the first and second terminals 550 and 560 when control switches 510(1) and 520(1) are turned on, and decoupled from the first and second terminals 550 and 560 when control switches 510(1) and 520(1) are turned off. In this regard, a capacitor may be considered enabled when the respective pair of control switches is turned on, and disabled when the respective pair of control switches is turned off.

The capacitance of the capacitor bank 505 is approximately equal to the sum of the capacitances of the capacitors in the bank that are enabled at a given time. Since the control switches control which capacitors are enabled at a given time, the controller 150 can control (adjust) the capacitance of the capacitor bank 505 by controlling which control switches are turned on and off (switched on and off) at a given time. For example, the controller 150 may increase the capacitance of the capacitor bank 505 by enabling more of the capacitors in the bank 505.

As discussed above, each one of the input capacitors Cin1 and Cin2 may be implemented with the switchable capacitor bank 505 shown in FIG. 5. This allows the controller 150 to adjust the capacitance of each input capacitor Cin1 and Cin2 by controlling which control switches in the respective capacitor bank are turned on and off. Each of the feedback capacitors Cfb1 and Cfb2 may also be implemented with a switchable capacitor bank similar to the switchable capacitor bank 505 shown in FIG. 5.

The SIMD controller 150 may also operate each receiver in a single-ended mutual-capacitance sensing mode according to certain aspects of the present disclosure. In this regard, operation of receiver 120a in the single-ended mutual-capacitance sensing mode will now be discussed with reference to FIG. 6. It is to be appreciated that each of the other receivers may also be operated in the single-ended mutual-capacitance sensing mode in the manner discussed below.

Figure 6:
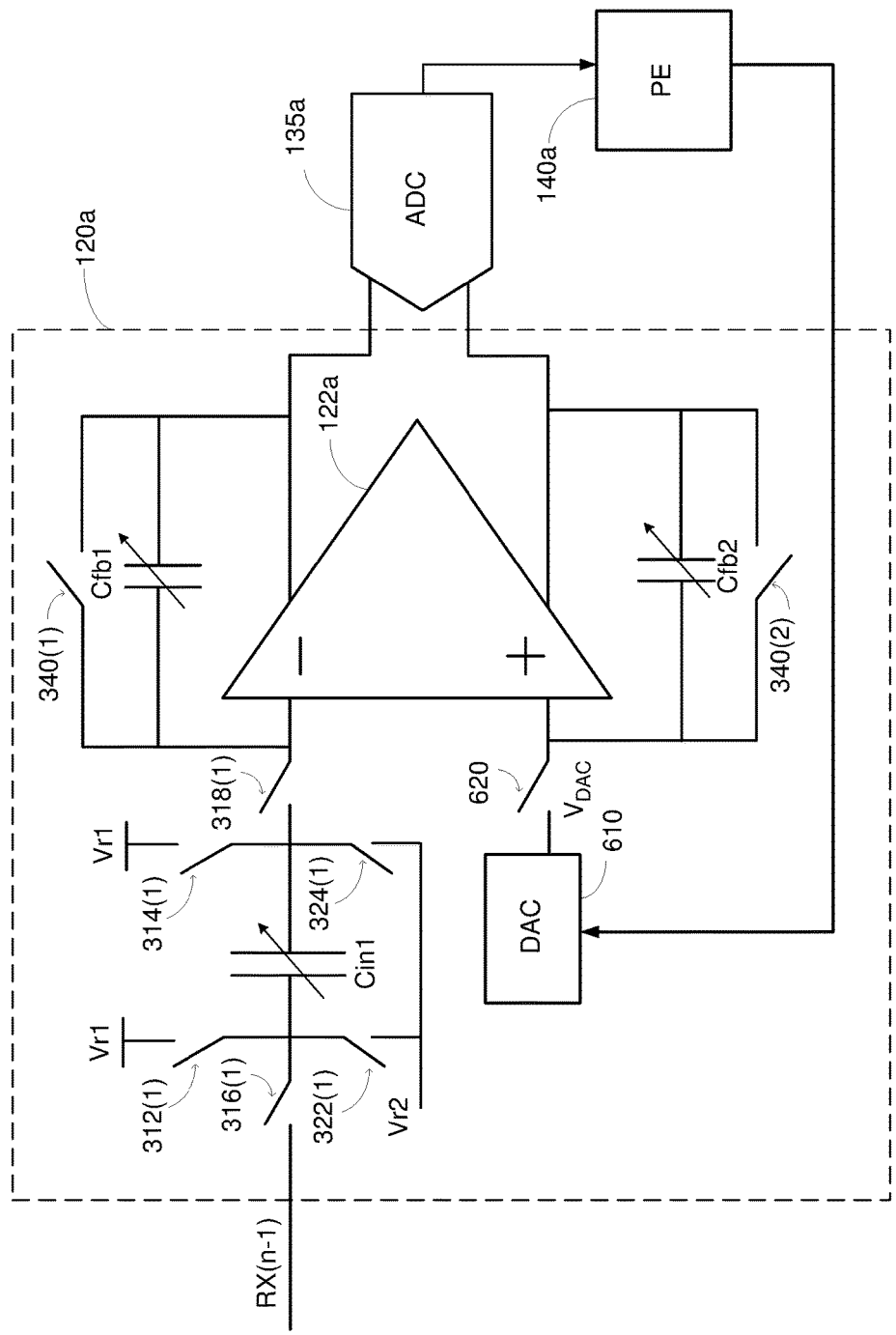
FIG. 6 shows an example of a receiver in a single-ended sensing mode configuration according to certain aspects of the present disclosure.

In the example in FIG. 6, the receiver 120a includes a digital-to-analog converter (DAC) 610, and a switch 620 between the output of the DAC 610 and the second input of the amplifier 122a. For ease of illustration, switches 312(2), 314(2), 316(2), 318(2), 322(2) and 324(2) and input capacitor Cin2 are not shown in FIG. 6.

In the single-ended mutual capacitance sensing mode, switch 620 is closed to couple the output of the DAC 610 to the second input of the amplifier 122a. In this mode, the receiver 120a is used to measure the capacitance of mutual capacitor Cm1 (not shown in FIG. 6) on receive line Rx(n−1). The output voltage of the DAC 610 (denoted "$V_{DAC}$") is controlled by a digital control signal from the respective PE 140a or the SIMD controller 150, as discussed further below.

In certain aspect, the PE 140a determines an output voltage setting for the DAC 610 during a calibration procedure. The calibration procedure may be performed at a factory. During the calibration procedure, the touch panel may be placed in a controlled environment in which no object (including a finger) is placed in proximity to the touch sensors of the touch panel. The SIMD controller 150 may then switch switches 316(1), 318(1), 322(1) and 324(1) according to the switching sequence discussed above in which input capacitor Cin1 is coupled to receive line RX(n−1) during a sampling phase to sample the voltage on self capacitor Csrx1, and input capacitor Cin1 is coupled to feedback capacitor Cfb1 during a charge transfer phase to transfer charge from input capacitor Cin1 to feedback capacitor Cfb1. In this case, the input capacitor Cin samples the voltage on self capacitor Csrx1 when no user finger is present. This voltage may be considered a baseline voltage for the self capacitor Csrx1.

Each time the receiver samples the voltage on the self capacitor Csrx1, the PE 140a or SIMD controller 150 may set the DAC 610 to a different output voltage $V_{DAC}$ and receive a digital signal (digital code) from the ADC 135a representing the differential output voltage of the amplifier 122a. The PE 140a may record the digital codes in memory, in which each digital code corresponds to a different output voltage of the DAC. After recording the digital codes for the different output voltages of the DAC 610, the PE 140a may evaluate the digital codes to determine the digital code corresponding to the smallest differential output voltage of the amplifier 122a. The determined digital code may be considered a baseline digital code. The PE 140 may then record the baseline digital code in the memory and set the output voltage of the DAC 610 to the output voltage corresponding to the baseline digital code. Thus, the calibration procedure determines an output voltage setting for the DAC 610 that results in a small differential output voltage for the baseline case (i.e., no user finger present). Reducing the differential output voltage of the amplifier for the baseline case increases the dynamic range of the ADC 135a in the single-ended mutual-capacitance sensing mode.

After the calibration procedure, the receiver 120 is ready to detect the presence of a user's finger in the single-ended mutual-capacitance sensing mode. In this mode, the SIMD controller 150 may switch switches 316(1), 318(1), 322(1) and 324(1) according to the switching sequence discussed above in which input capacitor Cin1 is coupled to receive line RX(n−1) during a sampling phase to sample the voltage on self capacitor Csrx1, and input capacitor Cin1 is coupled to feedback capacitor Cfb1 during a charge transfer phase to transfer charge from input capacitor Cin1 to feedback capacitor Cfb1. Each time the receiver samples the voltage on the self capacitor Csrx1, the PE 140a may receive the corresponding digital code from the ADC 135a, and subtract out the baseline digital code to obtain a compensated digital code. Because the baseline is subtracted out, the compensated digital code provides a measurement of the change in the capacitance of the corresponding mutual capacitor Cm1 due to the presence of a user's finger. Thus, in this mode, the presence of the user's finger is detected by detecting changes in the capacitance of the mutual capacitor Cm1.

In certain aspects, the DAC 610 and switch 620 may be implemented using input capacitor Cin2 and switches in the switch capacitor network 124a associated with input capacitor Cin2. Thus, components of the receiver 120a used for the differential mode may be reconfigured to implement the DAC 610. In these aspects, the SIMD controller 150 may first close (turn on) switches 312(2) and 324(2) and open switches 316(2), 322(2), 314(2) and 318(2) to charge input capacitor using reference voltage Vr1. Reference voltage Vr1 may be a fixed reference voltage equal to the supply voltage of the receiver or a fraction of the supply voltage.

After the input capacitor Cin2 is charged, the controller 150 may decouple input capacitor Cin2 from reference voltage Vr1 by opening switch 312(2). After input capacitor Cin2 is decoupled from reference voltage Vr1, the controller 150 may change the capacitance of input capacitor Cin2 to change (adjust) the voltage of input capacitor Cin2. For example, if the input capacitor Cin2 is implemented with the switchable capacitor bank 505 in FIG. 5, then the controller 150 may first charge input capacitor Cin2 using reference voltage Vr1 with only one of the capacitors (e.g., Cs1) in the bank 505 enabled. The controller 150 may then decouple input capacitor Cin2 from the reference voltage Vr1, and enable one or more additional capacitors in the bank 505 to reduce the voltage of input capacitor Cin2 to one of multiple different voltages via charge sharing. The greater the number of additional capacitors in the bank 505 that are enable, the greater the amount that the voltage of the input capacitor Cin2 is reduced. Thus, in this example, the controller 150 adjusts the voltage of the DAC implemented with input capacitor Cin2 by controlling the number of additional capacitors in the bank 505 that are enabled after input capacitor Cin2 is charged using reference voltage Vr1. Input capacitor Cin2 may then be coupled to the second input of the amplifier 122a by closing switches 322(2) and 318(2) with switches 312(2), 314(2), 316(2) and 324(2) opened.

In general, the controller 150 sets the voltage of the DAC implemented with input capacitor Cin2 by charging input capacitor Cin2 using reference voltage Vr1, decoupling input capacitor Cin2 from the reference voltage, and changing (adjusting) the capacitance of input capacitor Cin2 to produce one of multiple voltages supported by the DAC. Although reference voltage Vr1 is used in the above example, it is to be appreciated that input capacitor Cin2 may be charged using a different reference voltage. It is also to be appreciated that input capacitor Cin2 may be charged using a different switching sequence than the exemplary switching sequence given above.

The SIMD controller 150 may also operate each receiver in a differential self-capacitance sensing mode according to certain aspects of the present disclosure. In this regard, operation of receiver 120a in the differential self-capacitance sensing mode will now be discussed. It is to be appreciated that each of the other receivers may also be operated in the differential self-capacitance sensing mode in the manner discussed below.

Figure 7A:
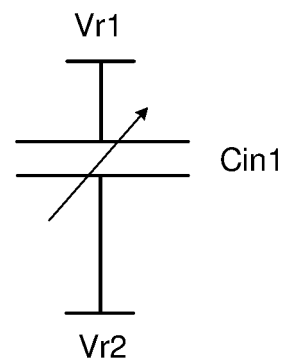
FIG. 7A shows an example of a capacitor being charged using a reference voltage according to certain aspects of the present disclosure.
Figure 7B:
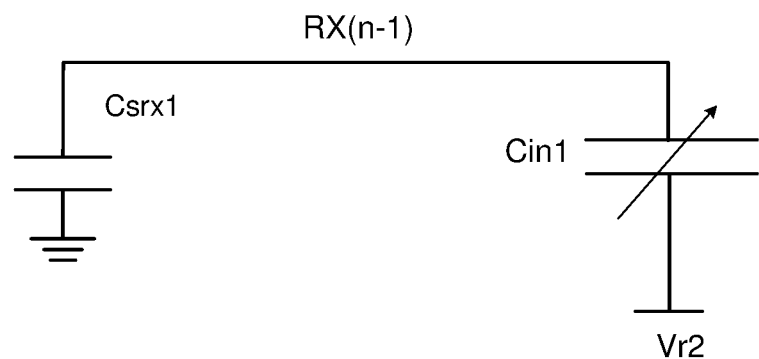
FIG. 7B shows an example of the capacitor in FIG. 7A providing charge to a capacitor of a receive line of the touch panel according to certain aspects of the present disclosure.

In this mode, the controller 150 configures receiver 120a to drive the self capacitances Csrx1 and Csrx2 of receive lines RX(n−1) and RX(n), respectively, and sense the voltages on self capacitances Csrx1 and Csrx2. To drive self capacitor Csrx1, the controller 150 uses input capacitor Cin1 to pump charge to self capacitor Csrx1 over multiple pump cycles. Each pump cycle includes a charging phase and a charge-sharing phase. During the charging phase, the controller closes switches 312(1) and 324(1) with switches 316(1), 322(1), 314(1) and 318(1) opened to charge input capacitor Cin1 to reference voltage Vr1. The connection for the charging phase is illustrated in FIG. 7A. During the charge-sharing phase, the controller opens switch 312(1) and closes switch 316(1) to decouple input capacitor Cin1 from the reference voltage Vr1 and couple input capacitor Cin1 to self capacitor Csrx1. This causes charge in input capacitor Cin1 to flow to self capacitor Csrx1 until the voltages of input capacitor Cin1 and self capacitor Csrx1 are approximately equal. The connection for the charge-sharing phase is illustrated in FIG. 7B.

Figure 8:
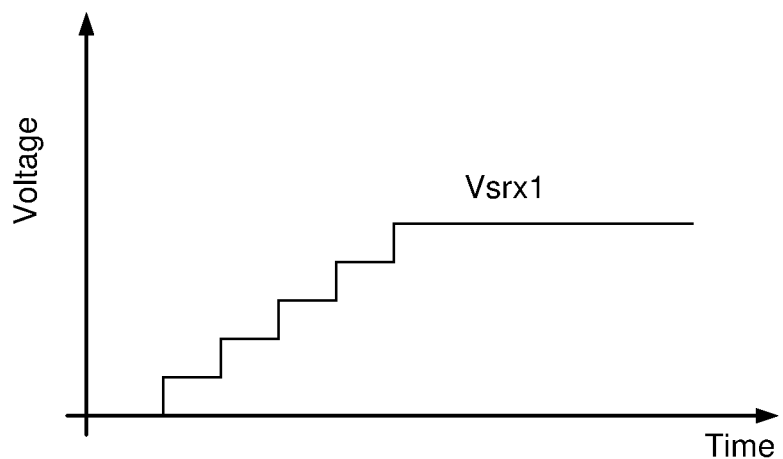
FIG. 8 is a timeline showing an example of the voltage of a receive line capacitor during charge pumping according to certain aspects of the present disclosure.

FIG. 8 is a timeline showing an example of the voltage on self capacitor Csrx1, in which charge is pumped to self capacitor Csrx1 over multiple pump cycles. As shown in FIG. 8, the voltage on self capacitor Csrx1 increases by a voltage step for each pump cycle. Although the voltage steps are shown as being uniform in FIG. 8 for simplicity, it is to be appreciated that this need not be the case. At the end of the pump cycles, the voltage on self capacitor Csrx1 is raised to voltage Vsrx1 in FIG. 8.

Self capacitor Csrx2 may be driven in a similar manner as self capacitor Csrx1. More particular, the controller 150 may configure receiver 120a to pump charge to self capacitor Csrx2 over multiple pump cycles using input capacitor Cin2 in a similar manner as discussed above for self capacitor Csrx1 using input capacitor Cin1.

Thus, the receiver 120a charge pumps self capacitor Csrx1 to a voltage (denoted "Vsrx1") and charge pumps self capacitor Csrx2 to a voltage (denoted "Vsrx2"). The voltage Vsrx1 of self capacitor Csrx1 depends on the capacitance of self capacitor Csrx1. The larger the capacitance of self capacitor Csrx1, the lower voltage Vsrx1. The presence of a user's finger typically causes the capacitance of self capacitor Csrx1 to increase, and therefore voltage Vsrx1 to decrease.

Similarly, the voltage Vsrx2 of self capacitor Csrx2 depends on the capacitance of self capacitor Csrx2. The larger the capacitance of self capacitor Csrx2, the lower voltage Vsrx2. The presence of a user's finger typically causes the capacitance of self capacitor Csrx2 to increase, and therefore voltage Vsrx2 to decrease.

After charge pumping, receiver 120a may sample the voltages Vsrx1 and Vsrx2 of self capacitors Csrx1 and Csrx2, respectively, to generate a differential voltage corresponding to the difference between the voltages Vsrx1 and Vsrx2. For example, the SIMD controller 150 may switch switches 316(1), 318(1), 322(1) and 324(1) according to the switching sequence discussed above in which input capacitor Cin1 is coupled to receive line RX(n-1) during a sampling phase to sample voltage Vsrx1, and input capacitor Cin1 is coupled to feedback capacitor Cfb1 during a charge transfer phase to transfer charge from input capacitor Cin1 to feedback capacitor Cfb1. Similarly, the SIMD controller 150 may switch switches 316(2), 318(2), 322(2) and 324(2) according to the switching sequence discussed above in which input capacitor Cin2 is coupled to receive line RX(n) during a sampling phase to sample voltage Vsrx2, and input capacitor Cin2 is coupled to feedback capacitor Cfb2 during a charge transfer phase to transfer charge from input capacitor Cin2 to feedback capacitor Cfb2.

Thus, the amplifier 122a outputs a differential voltage corresponding to the difference between the voltages Vsrx1 and Vsrx2. Since the voltages Vsrx1 and Vsrx2 depend on the capacitances of self capacitors Csrx1 and Csrx2, respectively, the differential output voltage of the amplifier 122a represents the difference in the capacitances of self capacitors Csrx1 and Csrx2. The difference between the capacitances of self capacitors Csrx1 and Csrx2 indicates the presence of the user's finger. This is because the surface of the user's finger is curved, and therefore changes (affects) the self capacitances by different amounts. Thus, the differential output voltage of the amplifier 122a can be used to detect the presence of a user's finger.

As discussed above, the receiver detects the presence of a user's finger in the differential self-capacitance sensing mode by detecting the difference in the capacitances of the self capacitances Csrx1 and Csrx2 of receive lines RX(n-1) and RX(n), respectively. The differential output voltage of the amplifier 122a (which indicates difference the between the capacitances of the self capacitances Csrx1 and Csrx2) allows a processor to detect the presence of a user's finger on receive lines RX(n-1) and RX(n). However, the differential output voltage may not allow the processor to determine the location of the user's finger on receive lines RX(n-1) and RX(n). In contrast, the differential output voltage in the differential mutual-capacitance sensing mode discussed above allows a processor to determine a location of a user's finger on receive lines RX(n-1) and RX(n). This is because the differential output voltage in the differential mutual-capacitance sensing mode indicates the difference between the mutual capacitances of two touch sensors on the receive lines RX(n-1) and RX(n), in which the touch sensors are driven via one of the transmission lines. In this case, the location of the user's finger corresponds to the intersection of the transmission line driving the two touch sensors and receive lines RX(n-1) and RX(n).

Thus, the differential self-capacitance sensing mode does not allow a processor to determine the location of a user's finger on the touch panel 110 with the same level of precision as the differential mutual-capacitance sensing mode. However, the differential self-capacitance sensing mode typically requires less power, and may therefore be used in applications that do not require a precise location of the user's finger on the touch panel 110 to conserve power.

For example, the controller 150 may configure the receivers 120 to operate in the differential self-capacitance sensing mode when the interface 112 is in a low-power mode. The interface 112 may enter the low-power mode, for example, when a user's finger is not detected for a predetermined period of time. When a user's finger is detected on the touch panel 110 by one of more of the receivers in the low-power mode, the controller 150 may respond by reconfiguring the receivers 120 to operate in the differential mutual-capacitance sensing mode discussed above. Thus, in this example, the receivers switch from the differential mutual-capacitance sensing mode to the differential self-capacitance sensing mode when a user's finger is detected in the low-power mode.

The SIMD controller 150 may also operate each receiver in a single-ended self-capacitance sensing mode according to certain aspects of the present disclosure. In this regard, operation of receiver 120a in the single-ended self-capacitance sensing mode will now be discussed with reference to FIG. 9. It is to be appreciated that each of the other receivers may also be operated in the single-ended self-capacitance sensing mode in the manner discussed below.

Figure 9:
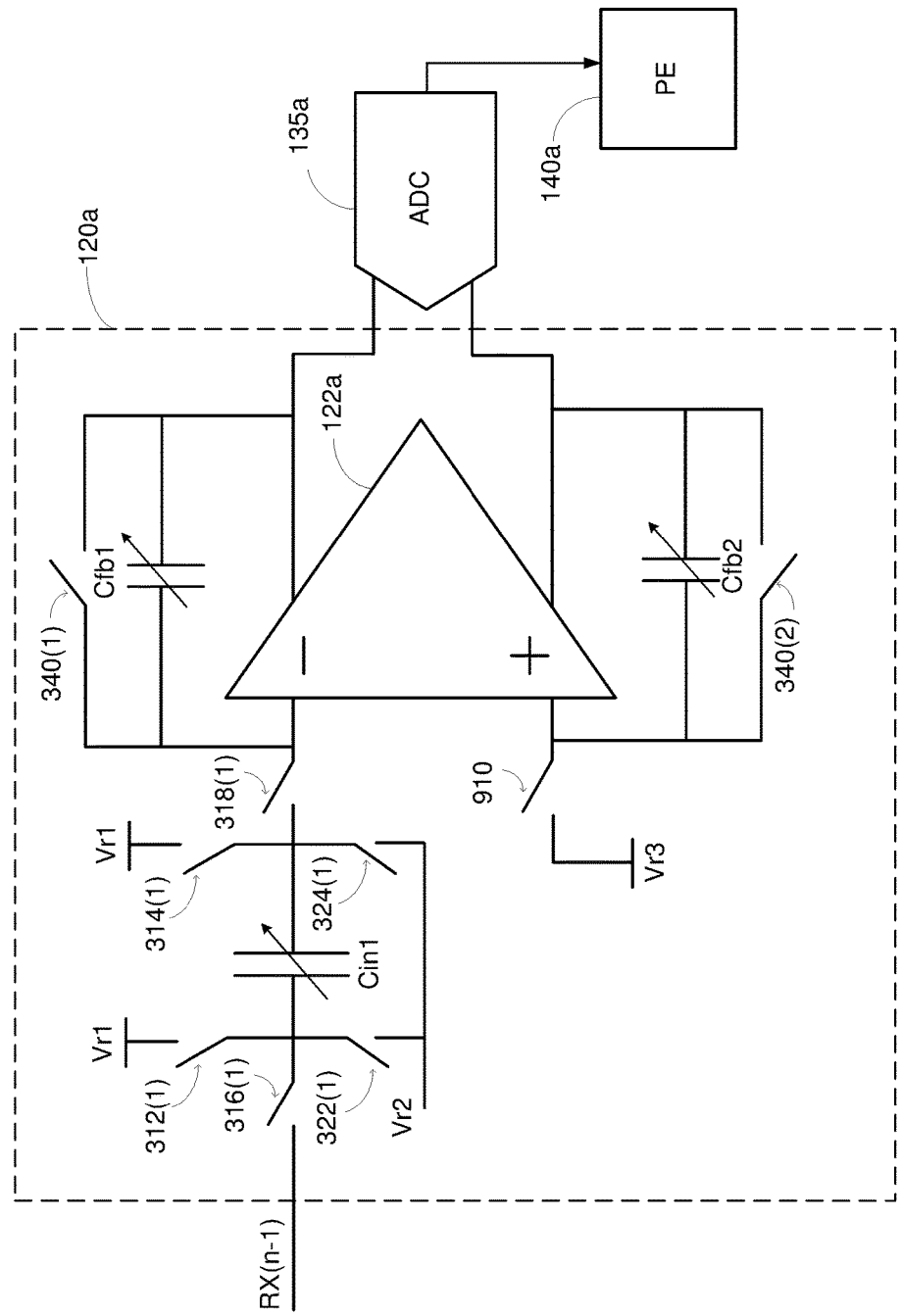
FIG. 9 shows another example of a receiver in a single-ended sensing mode configuration according to certain aspects of the present disclosure.

In the example in FIG. 9, the receiver 120a includes switch 910 for selectively coupling the second input of the amplifier 122a to reference voltage Vr3. For ease of illustration, switches 312(2), 314(2), 316(2), 318(2), 322(2) and 324(2) and input capacitor Cin2 are not shown in FIG. 9.

In the single-ended self capacitance sensing mode, switch 910 is closed to couple the second input of the amplifier 122a to reference voltage Vr3, which may approximately equal half the supply voltage of the receiver or another voltage.

In certain aspect, the PE 140a determines a charge pumping sequence for the receiver 120a during a calibration procedure. During the calibration procedure, the touch panel may be placed in a controlled environment in which no object (including a finger) is placed in proximity to the touch sensors of the touch panel. The controller 150 may then switch switches in the switch capacitor network to charge pump self capacitor Csrx1 using input capacitor Cin1, as discussed above. For example, the controller 150 may charge pump the self capacitor Csrx1 using different charge pumping sequences, in which each charge pumping sequence may include a different number of pump cycles. For each charge pumping sequence, the receiver 120a may sample the voltage Vsrx1 on self capacitor Csrx1. Since the charge pumping sequences have different numbers of pump cycles, the voltage Vsrx1 may be different for the different charge pumping sequences.

For each charge pumping sequence, the ADC 135 receives the corresponding differential output voltage from the amplifier 122a, and converts the differential output voltage into a corresponding digital code. The PE 140a receives the digital codes for the different charge pumping sequences from the ADC 135a and records the digital codes in memory. The PE 140a may evaluate the digital codes to determine the digital code corresponding to the smallest differential output voltage of the amplifier 122a. The determined digital code may be considered a baseline digital code. The PE 140 may then record the baseline digital code and the corresponding charge pumping sequence in the memory.

After the calibration procedure, the receiver 120a is ready to detect the presence of a user's finger in the single-ended self-capacitance sensing mode. In this mode, the SIMD controller 150 may configure receiver 120a to charge pump self capacitor Csrx1 using the charge pumping sequence determined in the calibration procedure and sample the resulting voltage Vsrx1 on the self capacitor Csrx1. Each time the receiver samples voltage Vsrx1 on the self capacitor Csrx1, the PE 140a may receive the corresponding digital code from the ADC 135a, and subtract out the baseline digital code to obtain a compensated digital code. Because the baseline is subtracted out, the compensated digital code provides a measurement of the change in the capacitance of self capacitor Csrx1 due to the presence of a user's finger. Thus, in this mode, the presence of the user's finger is detected by detecting changes in the capacitance of self capacitor Csrx1 from the baseline.

Figure 10:
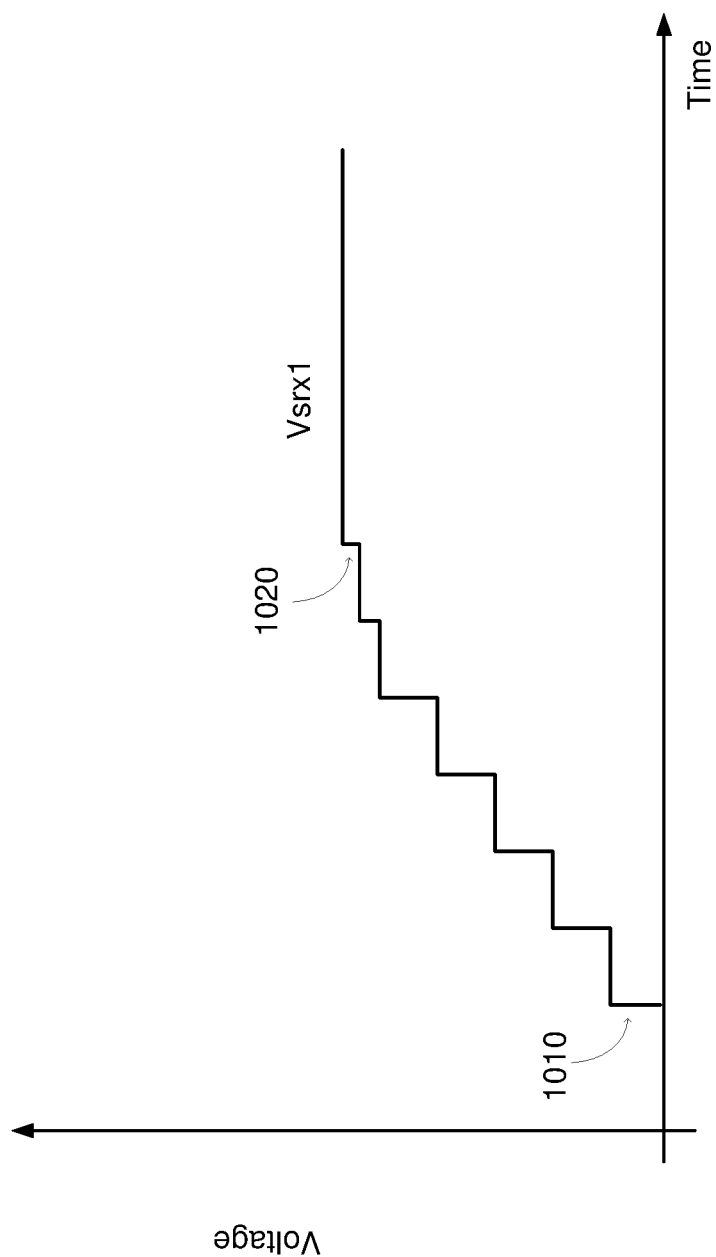
FIG. 10 is a timeline showing another example of the voltage of a receive line capacitor during charge pumping according to certain aspects of the present disclosure.

In certain aspects, the capacitance of input capacitor Cin may be adjusted during a charge pumping sequence to adjust the voltage step size. In this regard, FIG. 10 shows an example in which the voltage step size varies for a charge pumping sequence by adjusting the capacitance of input capacitor Cin. In this example, the input capacitor Cin is initially set to a first capacitance to provide relatively large voltage steps 1010. This may be done to reduce the number of pump cycles in the charge pumping sequence. In one example, the first capacitance may correspond to the largest (maximum) capacitance setting of input capacitor Cin. For the example in which input capacitor Cin is implemented with switchable capacitor bank 505, the input capacitor Cin may be set to the maximum capacitance by enabling all of the capacitors in the bank 505.

After a certain number of pump cycles, the controller 150 may decrease the capacitance of input capacitor Cin to reduce the voltage steps 1020. For the example in which input capacitor Cin is implemented with switchable capacitor bank 505, the controller 150 may decrease the capacitance by disabling one or more of the capacitors in the bank 505. The reduction in the voltage steps allows the controller 150 to control the voltage of the self capacitor with finer granularity during calibration. The finer granularity may allow the controller to achieve a smaller differential output voltage for the baseline during calibration.

It is to be appreciated that the time durations of the pump cycles and/or the voltage step sizes may be varied to drive capacitor Crsx1 with any one of a variety of different waveforms. The time durations of the pump cycles control the time intervals between the voltage steps. As discussed above, the sizes of the voltage steps may be controlled by adjusting the capacitance of input capacitor Cin.

After self capacitor Csrx1 is charged pumped and the voltage Vsrx1 is sampled, the charge on self capacitor Csrx1 may be removed to reset self capacitor Csrx1. In one example, this may be accomplished by shorting self capacitor Csrx1. For example, if reference voltage Vr2 is approximately ground, then self capacitor Csrx1 may be shorted to ground by closing switches 316(1) and 322(2). In another example, the controller may use input capacitor Cin1 to remove charge from self capacitor Csrx1 over multiple discharge cycles. During each discharge cycle, the controller may discharge input capacitor Cin by closing switches 322(1) and 324(1) with switch 316(1) opened. The controller may then couple input capacitor Cin to self capacitor Csrx1 by opening switch 322(1) and closing switch 316(1). This causes input capacitor Cin to remove a portion of the charge on self capacitor Csrx1. Thus, in this example, the charge on self capacitor Csrx1 is removed a portion at a time. The charge of self capacitor Csrx2 may be removed in a similar manner in the differential self-capacitance sensing mode The SIMD controller 150 may also operate each receiver in a charge amplifier mode according to certain aspects of the present disclosure. In this regard, operation of receiver 120a in the charge amplifier mode will now be discussed with reference to FIG. 11. It is to be appreciated that each of the other receivers may also be operated in the charge amplifier mode in the manner discussed below.

Figure 11:
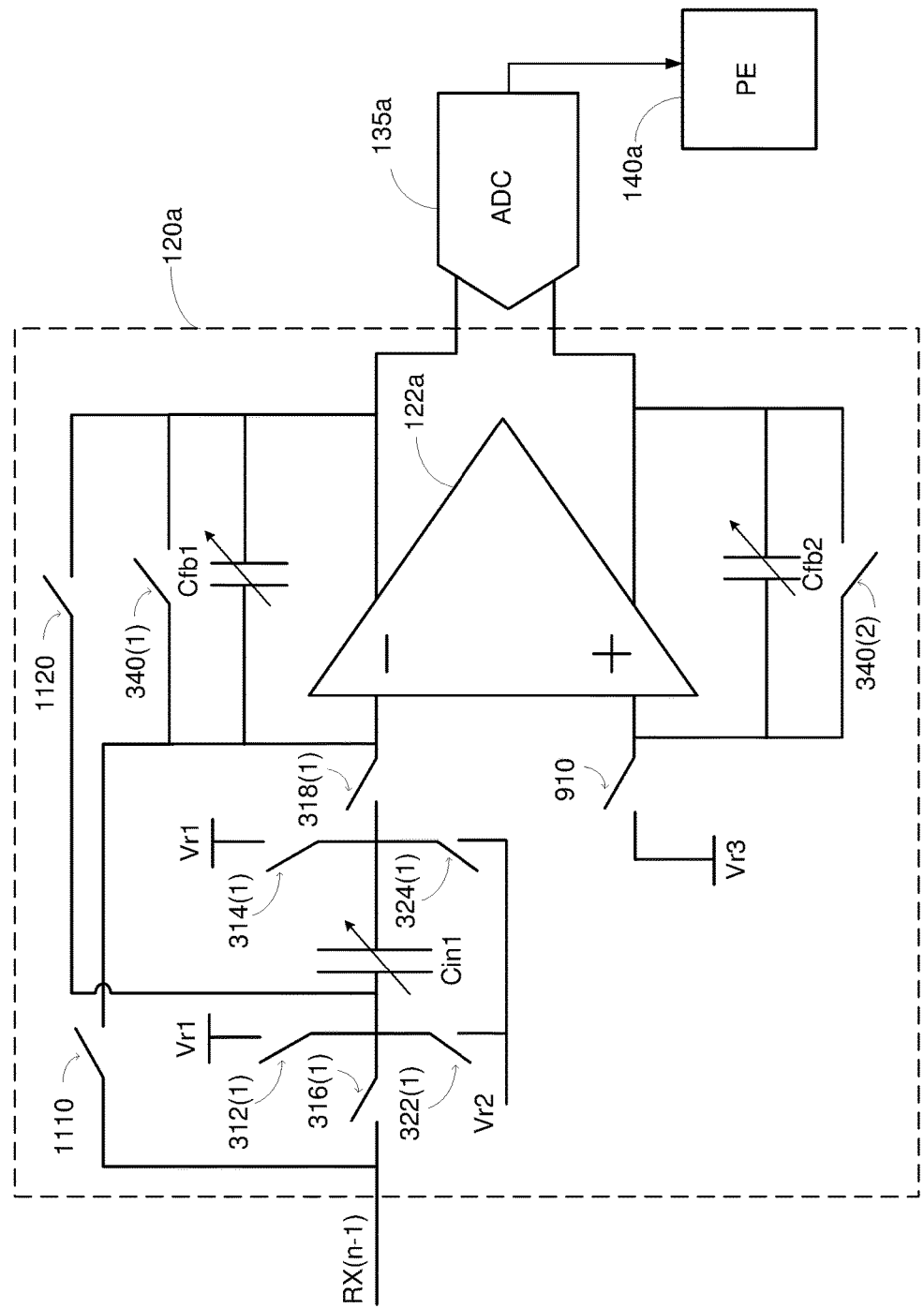
FIG. 11 shows an example of a receiver in a charge amplifier mode configuration according to certain aspects of the present disclosure.

In the example in FIG. 11, the receiver 120a includes switch 910 for selectively coupling the second input of the amplifier 122a to reference voltage Vr3. For ease of illustration, switches 312(2), 314(2), 316(2), 318(2), 322(2) and 324(2) and input capacitor Cin2 are not shown in FIG. 11. The receiver 120a also includes switch 1110 for coupling receive line Rx(n−1) to the first input of the amplifier, and switch 1120 for coupling input capacitor Cin in parallel with feedback capacitor Cfb2 to increase the feedback capacitance, as discussed further below.

In the charge amplifier mode, switch 910 is closed to couple the second input of the amplifier 122a to reference voltage Vr3, which may approximately equal half the supply voltage of the receiver or another voltage. Also, switch 1110 is closed to couple receive line RX(n−1) to the first input of the amplifier 122a. Switches 312(1), 314(1), 316(1), 322(1) and 324(1) are opened.

In addition, switches 318(1) and 1120 are closed to couple input capacitor Cin1 in parallel with feedback capacitor Cfb1. Thus, in this mode, the capacitance of input capacitor Cin1 is added to the feedback capacitance between the first input and first output of amplifier 122a, thereby increasing the feedback capacitance. A larger feedback capacitance may be needed in the charge amplifier mode to integrate a relatively large amount of charge from the mutual capacitor of a touch sensor on receive line Rx(n−1). If more feedback capacitance is needed in the charge amplifier mode, then the receiver 120a may include additional switches (not shown) for coupling input capacitor Cin2 in parallel with feedback capacitor Cfb1 and/or another capacitor in parallel with feedback capacitor Cfb1.

To sense a change in the capacitance of a mutual capacitor of a touch sensor due to the presence of a user's finger, a transmitter drives the mutual capacitor via the corresponding transmission line. The feedback capacitor of the amplifier integrates charge from the mutual capacitor to generate an output voltage that is a function of the capacitance of the mutual capacitor. The ADC 135 converts the output voltage into a digital code representing the change in the capacitance of the mutual capacitor.

Figure 12A:
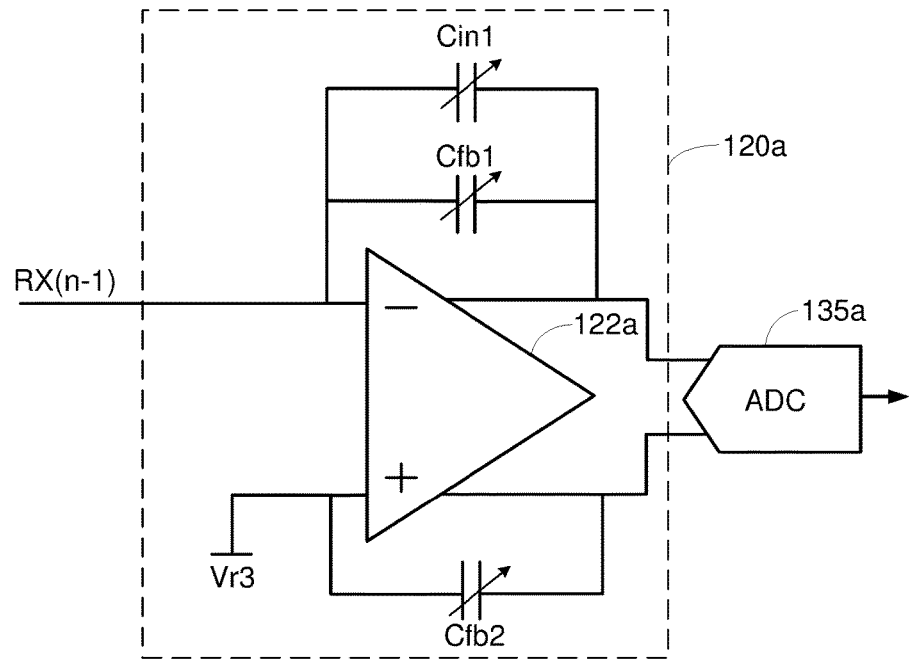
FIG. 12A shows an example of capacitor connections for the charge amplifier mode configuration according to certain aspects of the present disclosure.

FIG. 12A shows an example of the connections in the charge amplifier mode in which receive line RX(n−1) is coupled to the first input of the amplifier 122a and input capacitor Cin1 is coupled in parallel with feedback capacitor Cfb1 to increase the feedback capacitance.

Figure 12B:
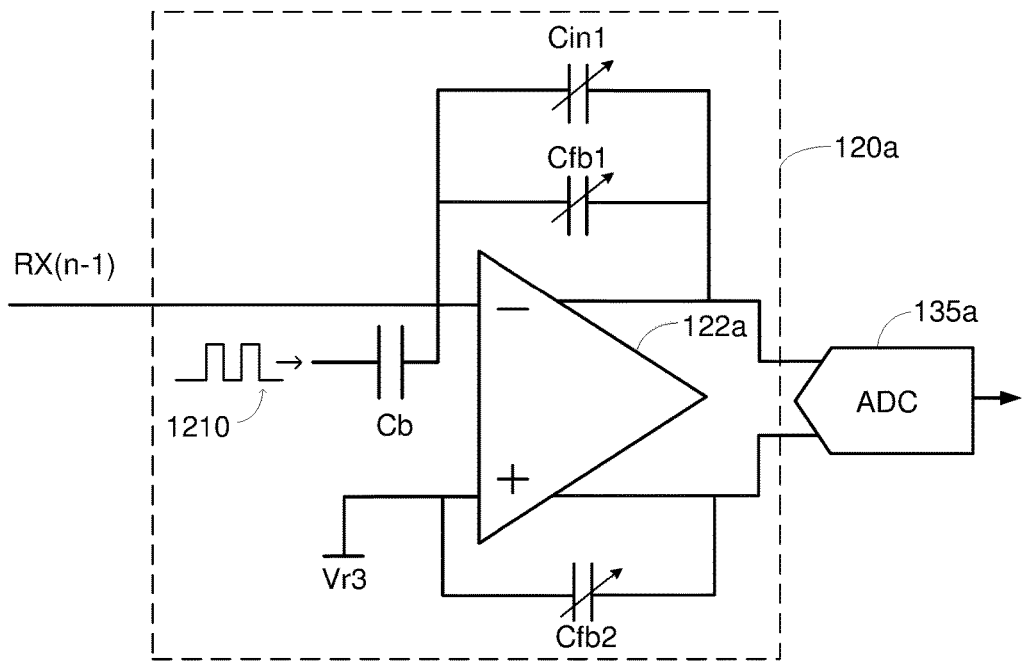
FIG. 12B illustrates a technique for removing baseline charge for the receiver in the charge amplifier mode configuration according to certain aspects of the present disclosure.

FIG. 12B shows an example in which a capacitor Cb is coupled to the first input of the amplifier 122a to remove some or all of the baseline charge from the mutual capacitor on receive line Rx(n−1). This may be done, for example, to improve the dynamic range of the ADC 135a. For example, capacitance of capacitor Cb may be approximately equal to the baseline capacitance of the mutual capacitor (i.e., capacitance of the mutual capacitor when no finger is present). During operation, capacitor Cb may then be driven by a signal 1210 that is the inverse of the signal used to drive the mutual capacitor. This causes capacitor Cb to remove the baseline charge from the mutual capacitor so that the remaining charge (which is integrated by the feedback capacitor of amplifier 122a) is due to the change in the capacitance of the mutual capacitor caused by the presence of the user's finger.

Thus, the SIMD controller 150 may configure (program) the receivers in the interface to operate in one of multiple different receiver modes including a differential mutual-capacitance sensing mode, a single-ended mutual-capacitance sensing mode, a differential self-capacitance sensing mode, a single-ended self-capacitance sensing mode, and a charge amplifier mode. Also, each receiver may reuse the same components for the different modes to conserve chip area. For example, input capacitor Cin1 in each receiver may be used to sample a voltage on the respective receive line, charge pump the respective receive line, and/or increase feedback capacitance depending on which mode is selected. Also, input capacitor Cin2 in each receiver may be used to sample a voltage on the respective receive line, charge pump the respective receive line, increase feedback capacitance and/or implement a DAC depending on which mode is selected. The high configurability of the receivers 120 allow the receivers to be used with different touch panel designs instead of having to develop a custom interface for each touch panel design, thereby reducing development costs.

As discussed above, the SIMD controller 150 may also configure (program) the PEs 140 to perform one or more digital operations (FFTs, demodulation, etc.). For example, the SIMD controller 150 may program the PEs to enable multiple transmissions lines to be driven simultaneously using, for example, Walsh coding and decoding, as discussed further below.

In a conventional system, the transmission lines of a touch panel are driven one at a time (e.g., sequentially driven). Each time one of the transmission lines is driven, the resulting signals on the receive lines are sensed in parallel by the receivers. For example, when transmission line Tx1 in FIG. 1 is driven with a signal (e.g., square-wave signal), the receivers 120 may sample the corresponding signals (e.g., voltages) on the receive lines Rx1 to Rx5 in parallel. In this example, the signals on the receive lines correspond to the touch sensors (e.g., mutual capacitors) located at the intersections of transmission line Tx1 and the receiver lines Rx1 to Rx5. A drawback of driving the transmission lines one at a time is that it increases the time needed to read the entire the touch panel.

To address, the SIMD controller 150 may program the PEs 140 to drive the transmission lines simultaneously using, for example, Walsh coding and decoding. For example, the controller 150 may configure each PE 140 to drive the respective transmitter 130 with a signal (e.g., sequence of pulses) that is multiplied with a different Walsh code. In another example, each PE 140 may simply drive the respective transmitter with the respective Walsh code. As discussed below, this allows the PEs 140 to separate out received signals corresponding to the different transmission lines using Walsh decoding. In this example, the controller 150 may configure the PEs 140 to drive the transmission lines simultaneously using the respective transmitters 130, in which the drive signal for each transmission line is coded with a different Walsh code.

The resulting signals received by each receiver 120 is a summation of signals corresponding to the different transmission lines since the transmission lines are driven simultaneously in this example. The controller 150 may configure each receiver 120 to sample the corresponding signals multiple times according to a sampling clock to generate multiple digital codes using the respective ADC 135. Each PE 140 may then perform Walsh decoding on the received digital codes based on the Walsh codes used by the transmitters 130. The Walsh decoding results in multiple sets of digital codes, in which each set of digital codes corresponds to one of the transmission lines. Thus, each PE 140 is able to separate out the received signals correspond to the different transmission lines using Walsh decoding. Although Walsh codes are used in the example given above, it is to be appreciated that the present disclosure is not limited to this example, and that other types of orthogonal codes may be used to simultaneously drive the transmission lines.

The SIMD controller 150 may also configure (program) the PEs 140 to perform filtering (e.g., FIR filtering) to filter out noise. For example, each PE 140 may be configured to filter out noise (e.g., noise generated by the display driver IC, human body self noise, etc.) by filtering out a frequency spectrum containing the noise. In this example, the transmission lines may be driven with signals having a different frequency spectrum as the noise so that the PEs 140 do not filter out the desired signals.

Figure 13:
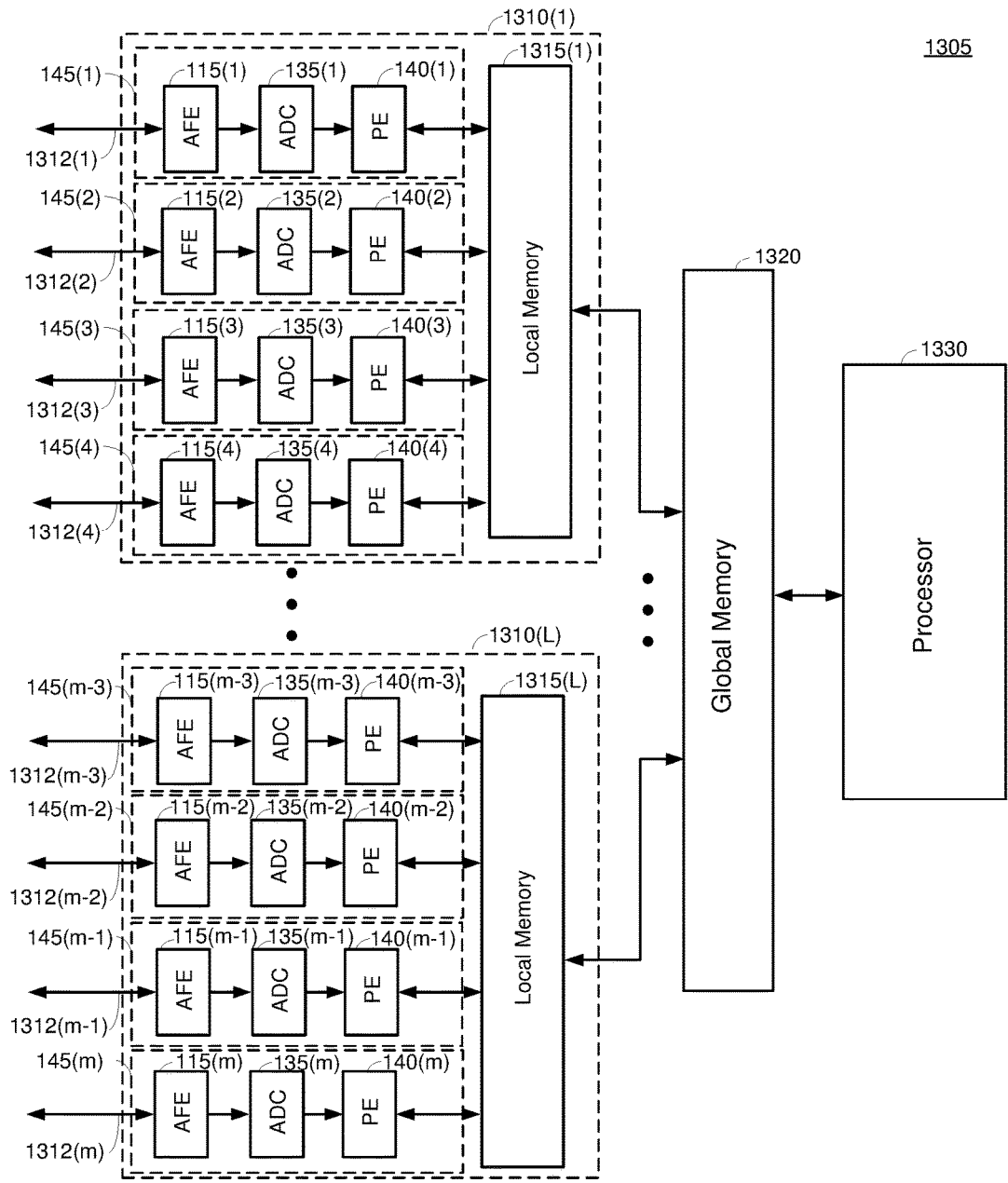
FIG. 13 shows an example of a processing architecture for a touch-panel interface according to certain aspects of the present disclosure.

FIG. 13 shows an exemplary processing architecture 1305 according to certain aspects of the present disclosure. The processing architecture 1305 includes multiple slices 145(1)-145(m), where each slice 145(1)-145(m) includes a respective analog front end (AFE) 115(1)-115(m), a respective analog-to-digital converter (ADC) 135(1)-135(m), and a respective processing engine PE 140(1)-140(m).

Each AFE 115(1)-115(m) includes a respective receiver (not shown in FIG. 13), which may be implemented using the exemplary receiver 120 shown in FIG. 3. Each AFE 115(1)-115(m) may also include a respective transmitter (not shown in FIG. 13) to drive one or more of the transmission lines of the touch panel, as discussed above.

The SIMD controller 150 (not shown in FIG. 13) may configure the receiver in each AFE 115(1)-115(m) to operate in any one of multiple different receiver modes including any one of the exemplary receiver modes discussed above. The receiver in each AFE 115(1)-115(m) is configured to receive sensor signals from the touch panel (not shown in FIG. 13) via a respective channel 1312(1)-1312(m). For a differential sensing mode, each channel may represent two adjacent receive lines of the touch panel. For a single-ended sensing mode, each channel may represent a single receive line of the touch panel.

The ADC 135(1)-135(m) in each slice 145(1)-145(m) converts the output signal of the respective receiver into a digital signal, which may be input to the respective PE 140(1)-140(m). The respective PE may include one or more programmable arithmetic logic units (ALUs) that perform digital processing on the respective digital signal. The digital processing may include one or more of Fast Fourier Transform (FFT), demodulation, filtering, averaging, Walsh decoding, baseline subtraction, etc. An exemplary implementation of one of the PEs 140(1)-140(m) is discussed below with reference to FIG. 14. As discussed further below, the SIMD controller 150 (not shown in FIG. 13) may program the PEs 140(1)-140(m) to perform the same digital processing on the respective digital signals (e.g., digital codes) in parallel based on the same instruction set.

In the exemplary processing architecture 1305, the slices 145(1)-145(m) are partitioned into multiple subsets 1310(1)-1310(L). In the example shown in FIG. 13, each subset 1310(1)-1310(L) includes four respective slices. However, it is to be appreciated that the present disclosure is not limited to this example, and that the number of slices in each subset may be different from four.

Each subset 1310(1)-1310(L) also includes a respective local memory 1315(1)-1315(L), which may include static random access memory (SRAM) and/or another type of memory. As discussed further below, each local memory 1315(1)-1315(L) may store digital values from the slices in the respective subset. The digital values in each local memory 1315(1)-1315(L) provides sensor information for a respective local region of the touch panel.

The exemplary processing architecture 1305 also includes a global memory 1320, and a processor 1330 (e.g., microprocessor). The processor 1330 may correspond to the host processor discussed above. The digital values in the local memories 1315(1)-1315(L) may be written to the global memory 1320 to provide sensor information for a large region of the touch panel (e.g., the entire touch panel) in the global memory 1320. As discussed further below, this allows the processor 1330 (which has access to the global memory 1320) to process digital values corresponding to the large region of the touch panel.

In operation, the receivers in the slices 145(1)-145(m) receive sensor signals from the respective channels 1312(1)-1312(m). For example, in a differential sensing mode, each receiver may receive sensor signals on respective adjacent receive lines, and output the received sensor signals as a differential output voltage that is a function of the difference between capacitances (e.g., mutual and/or self capacitances) of the adjacent receive lines. In another example, in a single-ended sensing mode, each receiver may receive sensor signal on a respective receive line, and output the received sensor signal as an output voltage that is a function of a capacitance (e.g., mutual and/or self capacitance) of the receive line.

The ADC 135(1)-135(m) in each slice 145(1)-145(m) converts the output signal (e.g., output voltage) of the respective receiver into a digital signal (digital code), which may be input to the respective PE 140(1)-140(m). Each PE 140(1)-140(m) performs digital processing on the respective digital signal. In the discussion below, a digital code is referred to as a digital value, which represents the value of the digital code.

In certain aspects, each ADC 135(1)-135(m) may sample the respective receiver output signal at different sampling times to generate multiple digital codes (digital values). For example, the SIMD controller 150 may run each receiver through multiple switching sequences, in which each switching sequence includes a sampling phase, a charge transfer phase, and a reset phase. At the end of the charge transfer phase for each switching sequence, the respective ADC 135(1)-135(m) may sample the receiver output signal (e.g., output voltage) to generate a respective digital value. In this example, the sampling times of the ADCs 135(1)-135(m) may be timed to coincide with the charge transfer phases of the switching sequences. Thus, in this example, each ADC outputs multiple digital values corresponding to the output of the respective receiver at different sampling times.

In these aspects, each PE 140(1)-140(m) performs digital processing on the respective digital values (i.e., digital values for the respective channel). For example, each PE 140(1)-140(m) may average the respective digital values to generate an average digital value. In another example, each PE 140(1)-140(m) may perform filtering (e.g., finite impulse response (FIR) filtering) on the respective digital values to filter out noise. For the example in which each receiver operates in a single-ended sensing mode, each PE 140(1)-140(m) may subtract the respective digital baseline code from each one of the respective digital values. Alternately, each PE 140(1)-140(m) may first compute the average of the respective digital values and then subtract the respective digital baseline code from the average digital value.

Thus, in this example, each PE 140(1)-140(m) performs digital processing on the digital values for the respective channel. Each PE 140(1)-140(m) may store the respective one or more processed digital values in the respective local memory 1315(1)-1315(L). For example, PEs 140(1)-140(4) may store their processed digital values in local memory 1315(1). For the example in which each PE 140(1)-140(m) averages the respective digital values, each PE 140(1)-140(m) may store the respective average digital value in the respective local memory 1315(1)-1315(L).

The processed digital values in the local memories 1315(1)-1315(L) may be written to the global memory 1320. For example, the processed digital values in each local memory may be assigned to one or more respective addresses in the global memory 1320. In this example, the digital values in each local memory is written to the one or more addresses in the global memory 1320 assigned to the local memory. It is to be appreciated that the global memory 1320 includes read/write circuitry (not shown) for writing digital values to the global memory 1320, and outputting the digital values from the global memory 1320 to the processor 1330 for processing by the processor 1330, as discussed further below. The processed digital values in the local memories 1315(1)-1315(L) may be written to the global memory 1320 sequentially and/or in parallel.

Thus, the digital values in the global memory 1320 are processed by the PEs 140(1)-140(m) before further processing by the processor 1330 (e.g., microprocessor). This reduces the amount of processing performed by the processor 1330. For the example in which the PEs 140(1)-140(m) average the digital values for the respective channels, the processor 1330 may process the average digital values generated by the PEs 140(1)-140(m) rather than the raw digital values output from the ADC 135(1)-135(m). The averaging reduces the amount of digital values that need to be processed by the processor 1330, thereby reducing the processing load on the processor 1330. In other words, a portion of the processing load is performed by the PEs 140(1)-140(m), which may perform processing that can done at the channel level (e.g., averaging, filtering, etc.).

The processor 1330 may read the digital values in the global memory 1320, and process the read digital values. Because the digital values in the global memory 1320 may come from all of the channels 1312(1)-1312(m), the digital values in the global memory 1320 provide the processor 1330 with a global view of the touch panel. For example, the processor 1330 may process the digital values to compute the positions of multiple fingers on the touch panel. In this example, the processor 1330 may compute the positions of the fingers on the touch panel based on changes in capacitances (e.g., mutual capacitances and/or self capacitances) of the touch panel indicated by the digital values.

In one example, the processor 1330 may process digital values for multiple frames to track the movements of one or more fingers on the touch panel. In this example, the slices 145(1)-145(m) generate digital values for each frame by receiving sensor signals from the touch panel via the channels, converting the received sensor signals into raw digital values (i.e., digital values generated by the ADCs 135(1)-135(m) in the slices 145(1)-145(m)), and processing the raw digital values to produce the digital values for the frame. The digital values for each frame may be written to the global memory 1320. The digital values for the frames may be generated at a predetermined frame rate. In this example, the processor 1330 processes the digital values for each frame to determine the positions of the one or more fingers on the touch panel for each frame. The processor may then process the positions of the one or more fingers over the multiple frames to track the movements of the one or more fingers over the multiple frames (e.g., to detect a user gesture such as slide, pinch, spread, etc.).

Thus, the processing architecture 1305 distributes processing among the PEs 140(1)-140(m) and the processor 1330. For example, the PEs 140(1)-140(m) may perform digital processing (e.g., averaging, filtering, etc.) on digital values from the respective ADCs 135(1)-135(m) to generate processed digital values. The processor 1330 may then perform additional digital processing on the processed digital values (e.g., to determine the positions of multiple fingers on the touch panel, to track movements of one or more fingers on the touch panel, etc.).

In the above example, each PE 140(1)-140(m) processes digital values for the respective channel. However, it is to be appreciated that the present disclosure is not limited to this example. For example, a PE may also perform digital processing on digital values from neighboring channels (e.g., channels in the same subset), as discussed further below with reference to FIG. 16.

Figure 14:
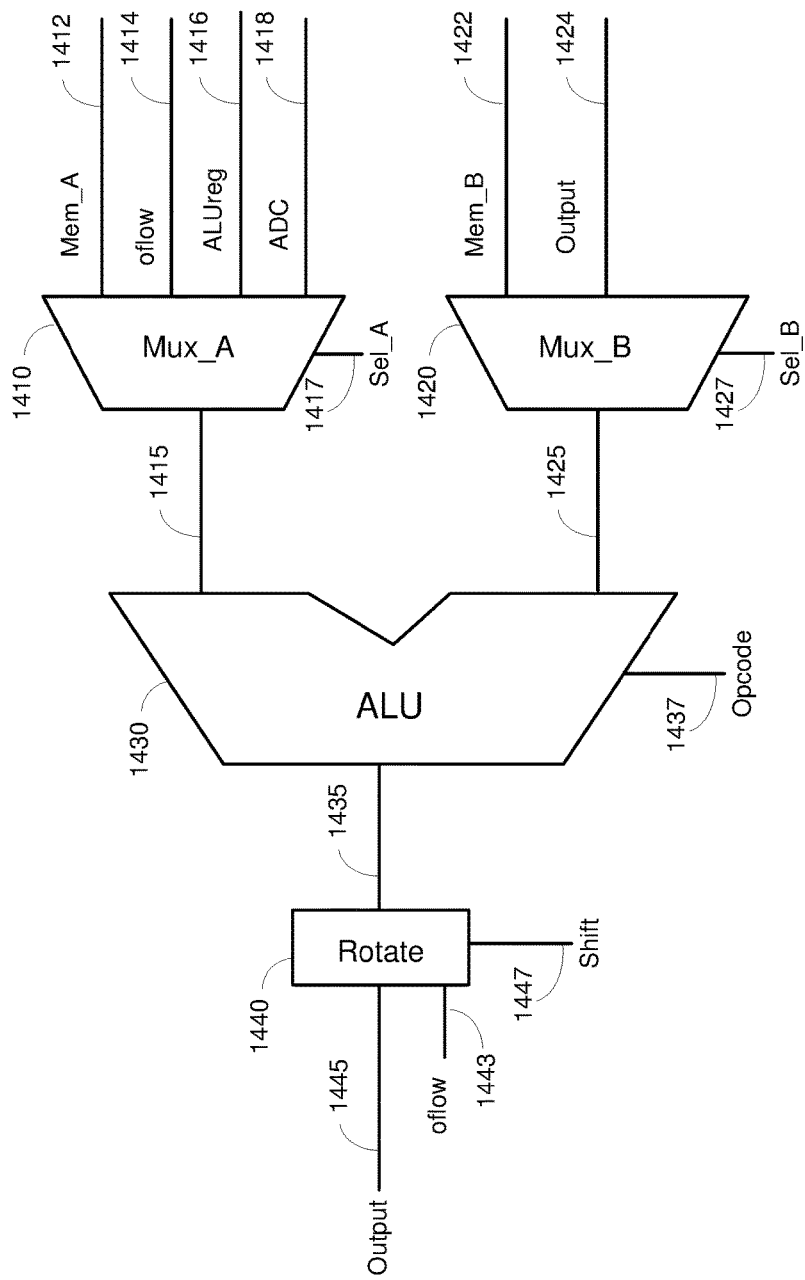
FIG. 14 shows an exemplary implementation of a processing engine according to certain aspects of the present disclosure.

FIG. 14 shows an exemplary implementation of a PE 140 according to certain aspects of the present disclosure. Each of the PEs 140(1)-140(m) shown in FIG. 13 may be implemented with the exemplary PE 140 shown in FIG. 14. The PE 140 includes a first multiplexer 1410 (labeled "Mux_A" in FIG. 14), a second multiplexer 1420 (labeled "Mux_B" in FIG. 14), an arithmetic logic unit (ALU) 1430, and a rotator 1440. It is to be appreciated that the PE 140 may include additional elements in addition to the elements shown in FIG. 14.

The first multiplexer 1410 has a first input 1412, a second input 1414, a third input 1416, and a fourth input 1418. The first input 1412 may receive a digital value (labeled "Mem_A") from the respective local memory, the second input 1414 may receive an overflow signal (labeled "oflow"), the third input 1416 may receive a digital value (labeled "ALUreg") from a register (not shown), and the fourth input 1418 may be coupled to the output of the respective ADC (i.e., the ADC in the same slice as the PE 140). The first multiplexer 1410 may include one or more additional inputs. In operation, the first multiplexer 1410 is configured to select one of the inputs of the first multiplexer 1410 according to a first select instruction (labeled "Sel_A") received at select input 1417, and couple the selected input to a first input 1415 of the ALU 1430, as discussed further below.

The second multiplexer 1410 has a first input 1422, and a second input 1414. The first input 1422 may receive a digital value (labeled "Mem_B") from the respective local memory, which may be different from the digital value received by the first input 1412 of the first multiplexer 1410. The second input 1424 may be coupled to the output 1445 of the PE 140. The second multiplexer 1420 may include one or more additional inputs. In operation, the second multiplexer 1420 is configured to select one of the inputs of the second multiplexer 1420 according to a second select instruction (labeled "Sel_B") received at select input 1427, and couple the selected input to a second input 1425 of the ALU 1430, as discussed further below.

The ALU 1430 is configured to receive a first operand at the first input 1415 from the first multiplexer 1410, to receive a second operand at the second input 1425 from the second multiplexer 1420, and to perform an arithmetic and/or logic operation on the operands according to an operation instruction (labeled "Opcode") received at input 1437. For example, the ALU 1430 may be configured to perform any one of multiple arithmetic and/or logic operations (e.g., addition, subtraction, etc.) on the first and second operands. In this example, the operation instruction Opcode (also referred to as operation selection code) selects which one of the multiple arithmetic and/or logic operations the ALU 1430 performs. The ALU 1430 outputs the result of the one or more arithmetic and/or logic operations at output 1435.

The rotator 1440 is coupled to the output 1435 of the ALU 1430, and is configured to rotate (shift) the output value of the ALU 1430 according to a shift instruction (labeled "Shift") received at input 1447. The rotator 1440 outputs the resulting shifted output value at output 1445. The rotator 1440 may also output an overflow signal (labeled "oflow") if there is an overflow at the output 1445.

In operation, the SIMD controller 150 programs the PE 140 to perform one or more operations by inputting a set of instructions to the PE 140 that causes the PE to perform the desired one or more operations. The set of instructions may include a first select instruction Sel_A for the first multiplexer 1410, a second select instruction Sel_B for the second multiplexer 1420, an operation instruction Opcode for the ALU 1430, and/or a shift instruction Shift for the rotator 1440. The set of instructions may be considered parts of a single longer instruction. The SIMD controller 150 may input the same set of instructions to the PEs 140(1)-140(m) of the slices in parallel so that the PEs 140(1)-140(m) perform the same digital processing on their respective digital values in parallel.

The SIMD controller 150 may program the PE 140 to sequentially perform a series of operations to perform a more complex operation. In this example, each operation in the series of operations may be specified by a set of instructions (e.g., a first select instruction Sel_A, a second select instruction Sel_B, an operation instruction Opcode, and/or a shift instruction Shift), in which the SIMD controller 150 sequentially inputs the set of instructions for each operation to the PE 140 to perform the more complex operation.

For example, the SIMD controller 150 may program the PE 140 to perform a series of add and/or shift operations to perform multiplication, division, averaging, filtering, FFT, etc. In this example, the PE 140 may receive the digital values directly from the output of the respective ADC at input 1418. Alternatively, the digital values may first be stored in the respective local memory. For example, the output of the respective ADC may be coupled to the respective local memory to store the digital values in the respective local memory. In this case, the PE 140 may receive the digital values from the respective local memory at input 1412 and/or input 1422. The PE 140 may also receive the digital values from a combination of the output of the respective ADC and the respective local memory. The output 1145 of the PE 140 may be stored in the respective local memory and/or output to the global memory 1320. The output of the PE 140 may also be fed back to the ALU 1430 via input 1424 (e.g., when the output is an intermediate result of a series of operations).

In one example, the PE 140 may also subtract a baseline digital code from a digital value (e.g., for a single-ended sensing mode) to generate a compensated digital value. In this example, the first and second multiplexers 1410 and 1420 may input the digital value and the baseline digital code to the ALU 1430, and the ALU 1430 may be instructed to perform subtraction to subtract the baseline digital code from the digital value. The baseline digital code may be received from a register via input 1416 or another input.

It is to be appreciated that the exemplary PE 140 may include additional elements in addition to the elements shown in FIG. 14. For example, the PE 140 may include one or more loading registers (not shown), in which one or more digital values in the respective local memory or another source are input to one or more of the multiplexers 1410 and 1420 via the one or more loading registers. In this example, the one or more loading registers may be used to control timing of the input of the one or more digital values to the one or more multiplexers.

In some embodiments, a new type of instruction (referred to as a phase instruction) is provided for programming a switch configuration for the switch capacitor networks in the AFEs 115(1)-115(m) of the slices 145(1)-145(m). In one example, a phase instruction includes multiple node values, in which each node value corresponds to a respective node in the switch capacitor network of each AFE and specifies a connection for the respective node. Using the example in which the switch capacitor network of each AFE is implemented with the switch capacitor network 124 shown in FIG. 3, one of the node values may correspond to node 315 in the switch capacitor network of each AFE. In this example, the node value for node 315 may specify whether node 315 is connected to reference voltage Vr1, reference voltage Vr2, receive line RX(n−1), and/or another element (not shown). As discussed further below, a decoder converts the node value into corresponding switch control signals to implement the connection specified by the node value. For example, if the node value for node 315 specifies that node 315 is connected to reference voltage Vr1, then the decoder converts the node value into switch control signals that close switch 312(1), and open switches 316(1) and 322(1) in the switch capacitor network of each AFE. Thus, the node values in a phase instruction allow a programmer to program connections for the nodes in the switch capacitor network of each AFE at a level of abstraction that does not require detailed knowledge of the switches.

Figure 15:
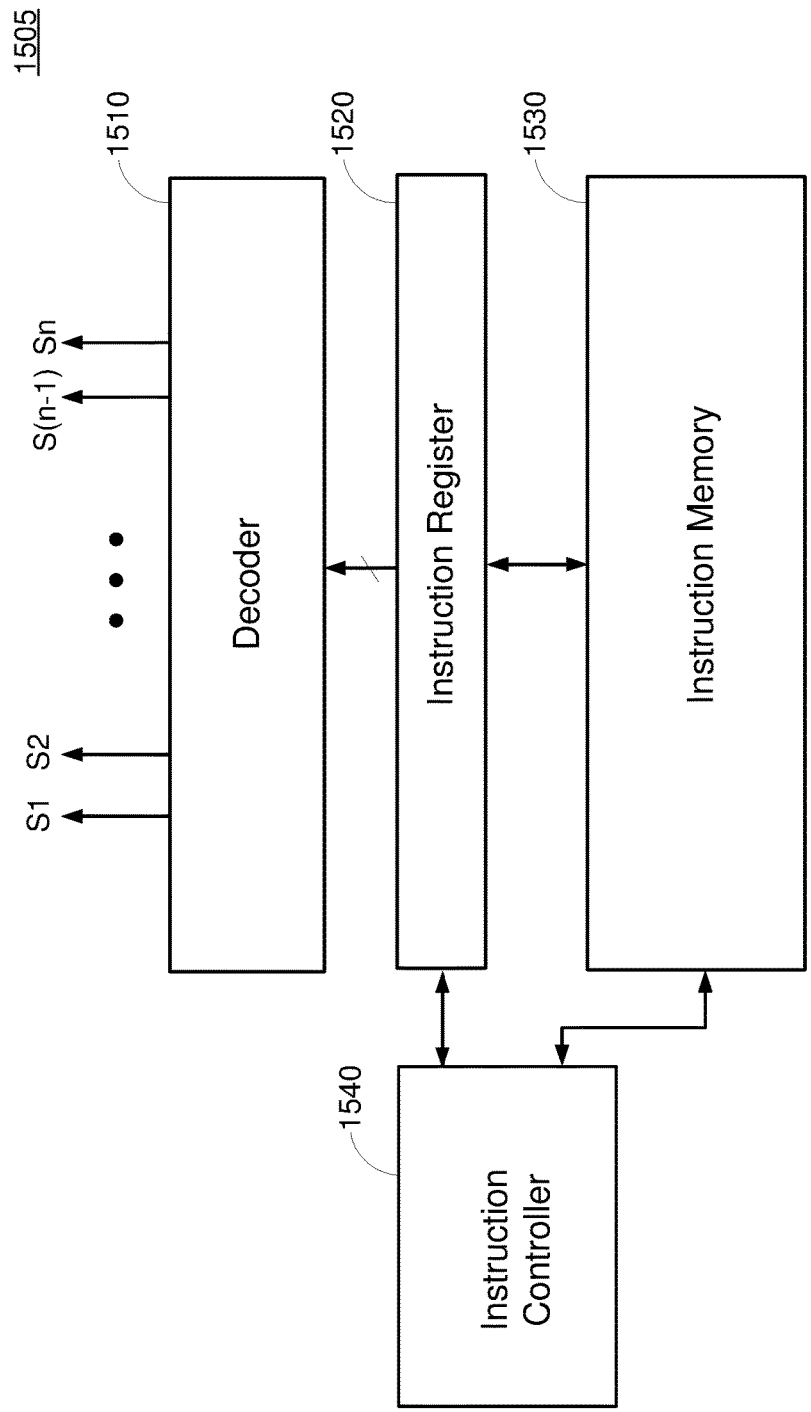
FIG. 15 shows an example of a SIMD controller according to certain aspects of the present disclosure.

FIG. 15 shows an exemplary system 1505 for programming switch configurations for the switch capacitor networks of the AFEs 115(1)-115(m) according to phase instructions. The system 1505 may be part of the SIMD controller 150. The system 1505 includes a decoder 1510, an instruction register 1520, an instruction memory 1530, and an instruction controller 1540.

The instruction memory 1530 may include multiple phase instructions, in which each phase instruction specifies a switch configuration for a particular phase. For example, a first one of the phase instructions may specify a switch configuration for a sampling phase, a second one of the phase instructions may specify a switch configuration for a charge transfer phase, a third one of the phase instructions may specify a switch configuration for a reset phase, etc. As disclosed further below, one of the phase instructions may be loaded into the instruction register 1520 at a time to implement the switch configuration specified by the phase instruction.

The decoder 1510 is configured to convert the phase instruction currently in the instruction register 1520 into corresponding switch control signals S1-Sn to implement the switch configuration specified by the phase instruction. For example, if the node value for node 315 in the phase instruction specifies that node 315 is connected to reference voltage Vr1, then the decoder 1510 converts the node value into corresponding switch control signals that close switch 312(1), and open switches 316(1) and 322(1) in the switch capacitor network of each AFE. The decoder 1510 may be implemented using hard-wired logic and/or programmable logic including combinational logic, latches, multiplexers, or any combination thereof. Each of the switch control signals S1-Sn may control a respective one of the switches in the switch capacitor network of each AFE. For example, a switch control signal may be asserted high (e.g., logic one) to turn on the respective switch, and asserted low (e.g., logic zero) to turn off the respective switch, or vice versa.

In the example in FIG. 15, one decoder 1510 is shown that controls the switches of the switch capacitor network of each AFE according to the phase instruction in the instruction register 1520. However, it is to be appreciated that the decoder 1510 may include multiple decoders (e.g., one for each switch capacitor network or a subset of switch capacitor networks), in which each decoder controls the switches of one or a subset of the switch capacitor networks according to the phase instruction in the instruction register 1520.

In operation, the instruction controller 1540 is configured to sequentially load multiple phase instructions from the instruction memory 1530 into the instruction register 1520 to implement a desired switching sequence. For example, to collect samples in the differential mutual-capacitance sensing mode, the instruction controller 1540 may load a first phase instruction into the instruction register 1520 to implement the switch configuration for the sampling phase. After the sampling phase, the instruction controller 1540 may load a second phase instruction into the instruction register 1520 to implement the switch configuration for the charge transfer phase. After the charge transfer phase, the instruction controller 1540 may load a third phase instruction into the instruction register 1520 to implement the switch configuration for the reset phase to define the DC voltage on the touch panel 110 before the next transmission signal (e.g., transmission pulse), as discussed above. Thus, the instruction controller 1540 may sequentially load multiple phase instructions from the instruction memory 1530 into the instruction register 1520 to sequentially execute the multiple phase instructions. The sequential execution of the phase instructions implements the desired switching sequence, in which each phase instruction specifies the switch configuration for one of the phases in the switching sequence.

Although the system 1505 is described above using the example in which the switch capacitor network in each AFE 115(1)-115(m) is implemented with the exemplary switch capacitor network 124 shown in FIG. 3, it is to be appreciated that the system 1505 is not limited to this example. Further, although the system 1505 is described using the example in which the system 1505 controls the switch configuration of the switch capacitor network of each one of the AFEs 115(1)-115(m) in parallel, it is to be appreciated that this need not be the case. For example, the system 1505 may control the switch configuration of the switch capacitor network of each one of a subset of the AFEs 115(1)-115(m) in parallel. For example, in certain applications, only a subset of the AFEs 115(1)-115(m) may be needed, in which case the subset of the AFEs may be enabled and the remaining AFEs may be disabled. In this example, the system 1505 may control the switch configuration of the switch capacitor network of each AFE in the enabled subset of AFEs in parallel.

Figure 16:
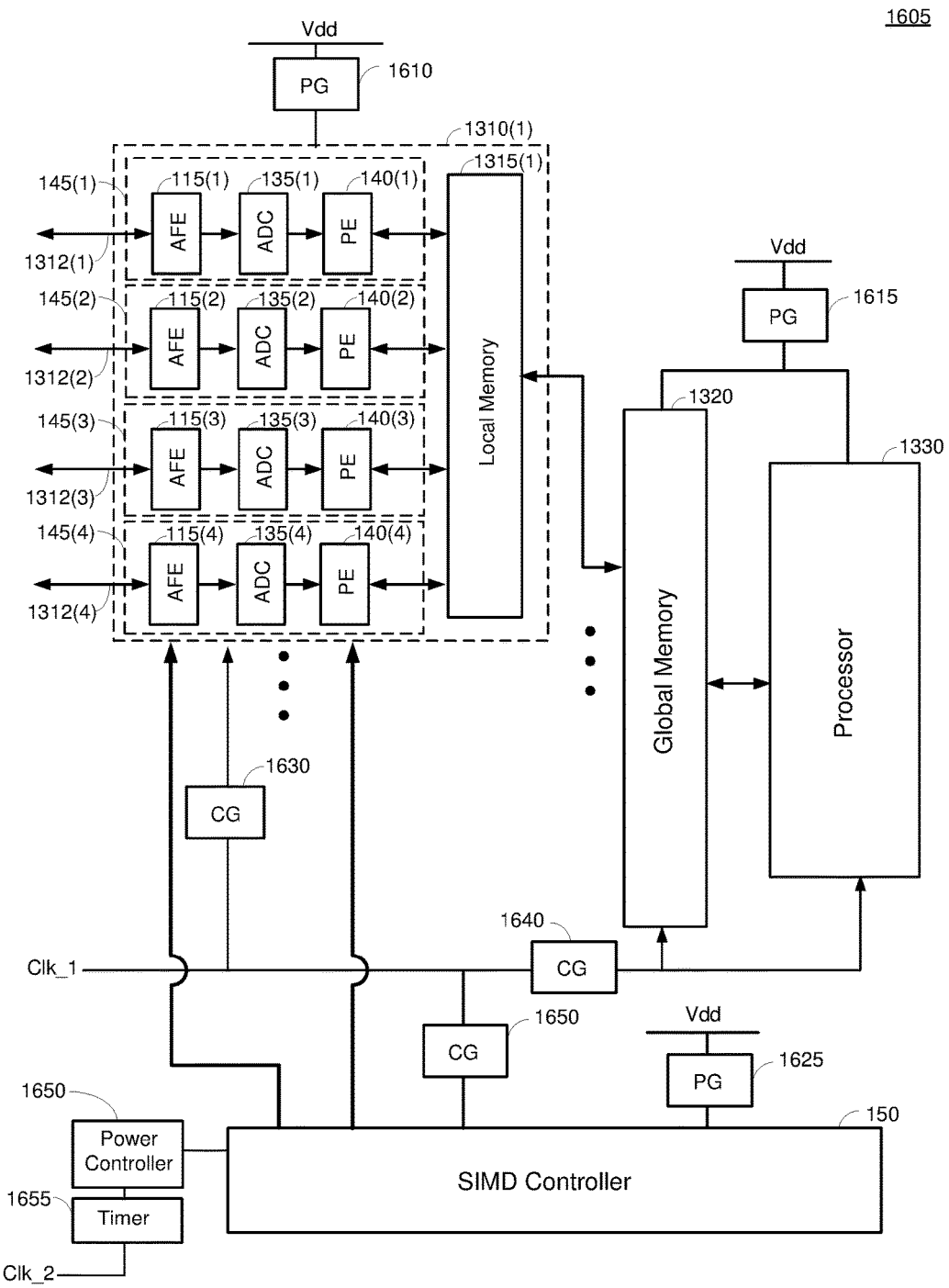
FIG. 16 shows an example of a power management architecture according to certain aspects of the present disclosure.

FIG. 16 shows an exemplary power management architecture 1605 according to certain aspects of the present disclosure. The power management architecture 1605 may be used with the exemplary processing architecture 1305 shown in FIG. 13. For ease of illustration, only one of the subsets 1310(1)-1310(L) is shown in FIG. 16. The power management architecture 1605 includes a first power gate 1610, a second power gate 1615, a third power gate 1625, a first clock gate 1630, a second clock gate 1640, a third clock gate 1650, a power controller 1650, and a timer 1655.

The first power gate 1610 is configured to control power to the slices 145(1)-145(m). In this regard, the first power gate 1610 is coupled between a supply rail Vdd and the slices 145(1)-145(m), and may be implemented with one or more power switches. The supply rail provides a supply voltage from a power source (e.g., a power management integrated circuit (PMIC)). When the first power gate 1610 is turned on, the first power gate 1610 couples the supply rail Vdd to the slices 145(1)-145(m), thereby powering the slices 145(1)-145(m). When the first power gate 1610 is turned off, the first power gate 1610 decouples the supply rail Vdd from the slices 145(1)-145(m), thereby power collapsing the slices 145(1)-145(m). As discussed further below, the slices may be powered collapsed when the slices 145(1)-145(m) are not being used to reduce power leakage, and therefore conserve power. The first power gate 1610 may also control power to the local memories 1315(1)-1315(L).

Although FIG. 16 shows an example in which one power gate is used to control power to the slices 145(1)-145(m), it is to be appreciated that the present disclosure is not limited to this example. For example, the power management architecture 1605 may include a separate power gate for each subset 1310(1)-1310(L) of the slices 145(1)-145(m). This allows the subsets to be independently power gated (power collapsed). For example, certain applications may only require some of the subsets. In this example, the power gates controlling power to the subsets that are being used are turned on, while the power gates controlling power to the remaining subsets may be turned off.

The second power gate 1615 is configured to control power to the global memory 1320 and the processor 1330. In this regard, the second power gate 1615 is coupled between the supply rail Vdd and the global memory 1320, and between the supply rail Vdd and the processor 1330. The second power gate 1615 may be implemented with one or more power switches. When the second power gate 1615 is turned on, the second power gate 1615 couples the supply rail Vdd to the global memory 1320 and the processor 1330, thereby powering the global memory 1320 and the processor 1330. When the second power gate 1615 is turned off, the second power gate 1615 decouples the supply rail Vdd from the global memory 1320 and the processor 1330, thereby power collapsing the global memory 1320 and the processor 1330.

Although FIG. 16 shows an example in which one power gate is used to control power to the global memory 1320 and the processor 1330, it is to be appreciated that the present disclosure is not limited to this example. For example, the power management architecture 1605 may include separate power gates for the global memory 1320 and the processor 1330 to independently power gate the global memory 1320 and the processor 1330.

The third power gate 1625 is configured to control power to the SIMD controller 150. In this regard, the third power gate 1625 is coupled between the supply rail Vdd and the controller 150, and may be implemented with one or more power switches. When the third power gate 1625 is turned on, the third power gate 1625 couples the supply rail Vdd to the controller 150, thereby powering the controller 150. When the third power gate 1625 is turned off, the third power gate 1625 decouples the supply rail Vdd from the controller 150, thereby power collapsing the controller 150.

The first clock gate 1630 is configured to control a first clock signal (labeled "Clk_1") to the slices 145(1)-145(m). The first clock signal Clk_1 may be used to time operations of the AFEs 115(1)-115(m), the ADCs 135(1)-135(m) and/or the PEs 140(1)-140(m). The first clock signal Clk_1 may come from a phase locked loop (PLL) or another clock source. When the first clock gate 1630 is enabled, the first clock gate 1630 passes the first clock signal Clk_1 to the slices 145(1)-145(m). When the first clock gate 1630 is disabled, the first clock gate 1630 gates the first clock signal Clk_1 (i.e., blocks the first clock signal Clk_1 from the slices 145(1)-145(m)). This reduces dynamic power consumption by the slices 145(1)-145(m) by preventing switching activity in the slices 145(1)-145(m). As discussed further below, the first clock gate 1630 may gate the first clock signal Clk_1 when the slices are not being used to conserve power. The first clock gate 1630 may also control the first clock signal Clk_1 to the local memories 1315(1)-1315(L).

Although FIG. 16 shows an example in which one clock gate is used to control the first clock signal Clk_1 to the slices 145(1)-145(m), it is to be appreciated that the present disclosure is not limited to this example. For example, the power management architecture 1605 may include a separate clock gate for each subset 1310(1)-1310(L) of the slices 145(1)-145(m). This allows the subsets to be independently clock gated. For example, certain applications may only require some of the subsets. In this example, the clock gates controlling the clock signal to the subsets that are being used are enabled, while the clock gates controlling the clock signal to the remaining subsets may be disabled to reduce dynamic power.

The second clock gate 1640 is configured to control the first clock signal Clk_1 to the global memory 1320 and the processor 1330. The first clock signal Clk_1 may be used to time operations of the global memory 1320 and the processor 1330. When the second clock gate 1640 is enabled, the second clock gate 1640 passes the first clock signal Clk_1 to the global memory 1320 and the processor 1330. When the second clock gate 1640 is disabled, the second clock gate 1640 gates the first clock signal Clk_1 (i.e., blocks the first clock signal Clk_1 from the global memory 1320 and the processor 1330). As discussed further below, the second clock gate 1640 may gate the first clock signal Clk_1 when the global memory 1320 and the processor 1330 are not being used to conserve power.

Although FIG. 16 shows an example in which one clock gate is used to control the clock signal to the global memory 1320 and the processor 1330, it is to be appreciated that the present disclosure is not limited to this example. For example, the power management architecture 1605 may include separate clock gates for the global memory 1320 and the processor 1330 to independently gate the clock signal to the global memory 1320 and the processor 1330.

In the example in FIG. 16, the first clock signal Clk_1 is used to clock the slices 145(1)-145(m) and the processor 1330. However, it is to be appreciated that the present disclosure is not limited to this example, and that different clock signals may be used for the slices 145(1)-145(m) and the processor 1330. In this case, the clock signal for the slices 145(1)-145(m) is selectively gated using the first clock gate 1630, and the clock signal for the processor 1330 is selectively gated using the second clock gate 1640. Thus, the slices 145(1)-145(m) and the processor 1330 may operate in the same clock domain or different clock domains.

The third clock gate 1650 is configured to control the first clock signal Clk_1 to the controller 150. The first clock signal Clk_1 may be used to time operations of the controller 150. When the third clock gate 1650 is enabled, the third clock gate 1650 passes the first clock signal Clk_1 to the controller 150. When the third clock gate 1650 is disabled, the third clock gate 1650 gates the first clock signal Clk_1 (i.e., blocks the first clock signal Clk_1 from the controller 150).

In certain aspects, one or more devices (e.g., slices 145(1)-145(m), processor 1330, and controller 150) may be put to sleep for a predetermined sleep period to conserve power. The one or more devices may be put to sleep by disabling the respective clock gates and/or turning off the respective power gates. In these aspects, the power controller 1650 is configured to track the amount of time that the one or more devices are asleep using the timer 1655, and to wake up the one or more devices at the end of the sleep period. The power controller 1650 may wake up the one or more devices by enabling the respective clock gates and/or turning on the respective power gates.

In one example, the timer 1655 includes a counter that runs off of a second clock signal Clk_2. The second clock signal Clk_2 may have a lower frequency than the first clock signal Clk_1 to reduce the power consumption of the timer 1655. The count value of the counter may increment by one for each cycle (period) of the second clock signal Clk_2.

In one example, the power controller 1650 may start the counter at the start of the sleep period. The power controller 1650 may then compare the count value of the counter with a sleep count value, in which the sleep count value is set according to the predetermined sleep period and may be stored in a register. When the count value of the counter reaches the sleep count value, the power controller 1650 wakes up the one or more devices. The power controller 1650 may also reset the counter for the next sleep period.

In another example, the power controller 1650 sets the count value of the counter to the sleep count value at the start of the sleep period. The counter may then count down from the sleep count value. In this example, the power controller 1650 may wake up the one or more devices when the counter counts down to zero.

The controller 150 may program the sleep count value into the power controller 150. For example, the controller 150 may execute a sleep instruction (also referred to as an idle instruction) that includes a parameter specifying the sleep count value.

The power controller 1650 allows the controller 150 to put itself to sleep for a predetermined sleep period to conserve power. For example, the controller 150 may program a sleep count value corresponding to the sleep period into the power controller 1650 and instruct the power controller 1650 to put the controller 150 to sleep and wake up the controller 150 at the end of the sleep period. The power controller 1650 may then disable the third clock gate 1650 and/or turn off the third power gate 1625 to put the controller 1650 to sleep. For ease of illustration, the connections between the power manager and the clock and power gates are not explicitly shown in FIG. 16. At the end of the sleep period, the power controller 1650 enables the third clock gate 1650 and/or turns on the third power gate 1625 to wake up the controller 1650. Exemplary cases in which the controller 150 may put itself to sleep are discussed below according to certain aspects.

In certain aspects, the controller 150 may place the touch-panel interface in a low-power mode to conserve power. For example, the controller 150 may place the touch-panel interface in the low-power mode when a user's finger is not detected for a predetermined period of time, when a mobile device incorporating the touch panel times out, etc. In the low-power mode, the controller 150 may put the slices 145(1)-145(m) to sleep most of the time, and periodically wake up the slices 145(1)-145(m) for short durations at a time to monitor the touch panel for the presence of a user's finger. During each short duration, the controller 150 may operate the slices 145(1)-145(m) in a self-capacitance sensing mode to detect the presence of a user's finger. As discussed above, the self-capacitance sensing mode generally does not resolve the position of the user's finger with the same precision as a mutual-capacitance sensing mode. However, the self-capacitance sensing mode consumes less power and may be sufficient to detect the presence of a user's finger on the touch panel for the purpose of determining whether to exit the low-power mode.

When a user's finger is detected, the controller 150 takes the touch-panel interface out of the low-power mode, and operates the touch-panel interface in a normal mode. In the normal mode, the controller 150 may operate the slices 145(1)-145(m) in a mutual-capacitance sensing mode to detect the positions of one or more fingers on the touch panel, and/or to track movements of the one or more fingers on the touch panel.

As discussed above, in the low-power mode, the controller 150 may put the slices 145(1)-145(m) to sleep most of the time, and periodically wake up the slices 145(1)-145(m) for short durations at a time to monitor the touch panel for the presence of a user's finger. In one example, the controller 150 may set the sleep time between wakeups by setting the sleep count value of the timer 1655 accordingly.

In the low-power mode, after the touch panel is monitored for a short duration without detection of the user's finger, the controller 150 may instruct the power controller 1650 to put the slices 145(1)-145(m) and the controller 150 to sleep. The power controller 1650 may put the slices 145(1)-145(m) to sleep by disabling the first clock gate 1630 and/or turning off the first power gate 1610, and put the controller 150 to sleep by disabling the third clock gate 1650, and/or turning off the third power gate 1625. The power controller 1650 may then track the amount of time that the slices 145(1)-145(m) and the controller 150 are asleep using the timer 1655, as discussed above. At the end of the sleep time, the power controller 1650 wakes up the slices 145(1)-145(m) by enabling the first clock gate 1630 and/or turning on the first power gate 1610, and wakes up the controller 150 by enabling the third clock gate 1650, and/or turning on the third power gate 1625.

The controller 150 then operates the slices 145(1)-145(m) for a short time duration in a self-capacitance sensing mode to monitor the touch panel for the presence of the user's finger. Exemplary techniques for detecting the user's finger are discussed further below. If the user's finger is not detected within the short time duration, then the controller 150 instructs the power controller 1650 to put the slices 145(1)-145(m) and the controller 150 back to sleep, in which case, the above process is repeated. If the user's finger is detected, then the controller 150 takes the touch-panel interface out of the low-power mode, as discussed above.

As discussed above, after waking up, the controller 150 operates the slices 145(1)-145(m) in a self-capacitance sensing mode for a short time duration to monitor the touch panel for the user's finger. In this regard, the receiver in each slice 145(1)-145(m) may receive one or more sensor signals from the respective channel, and output the received one or more sensor signals as one or more output voltages to the respective ADC. The ADC 135(1)-135(m) in each slice 145(1)-145(m) converts the one or more output voltages of the respective receiver into one or more digital values, which may be input to the respective PE 140(1)-140(m). If the single-ended self-capacitance sensing mode is used, then each PE may subtract the respective baseline digital code from the respective one or more digital values.

Each PE 140(1)-140(m) may then compare each one of the respective one or more digital values with a detection threshold, and generate a detection indicator if one or more of the respective digital values are above the detection threshold. Alternatively, each PE 140 140(1)-140(m) may average the one or more respective digital values, compare the resulting average value with a detection threshold, and generate a detection indicator if the average value is above the detection threshold. A detection indicator may indicate detection of the user's finger on the respective channel. If a PE generates a detection indicator, then the PE may write the detection indicator to the respective local memory or another memory accessible by the controller 150.

The controller 150 may then look in the local memories or the other memory for any detection indicators. In one example, the controller 150 may take the touch-panel interface out of the low-power mode if the controller 150 finds one or more detection indicators. In another example, the controller may require two or more detection indicators corresponding to adjacent channels before taking the touch-panel interface out of the low-power mode. This may be done so that a false detection one a single channel due to noise does not cause the controller 150 to take the touch-panel interface out of the low-power mode. This example assumes that the receive lines of adjacent channels are spaced close enough such that the presence of a user's finger will be detected on more than one channel.

In the above example, each PE 140(1)-140(m) processes one or more digital values for the respective channel, and generates a detection indicator if a user's finger is detected on the respective channel based on the one or more digital values for the respective channel. However, it is to be appreciated that the present disclosure is not limited to this example. For example, a PE may perform digital processing on digital values from neighboring channels (e.g., channels in the same subset) to detect the presence of the user's finger on the neighboring channels, as discussed further below.

In certain aspects, in the low-power mode, one PE is used in each subset 1310(1)-1310(L) to process the digital values from the channels corresponding to the subset. In these aspects, the receiver in each slice 145(1)-145(m) receives one or more sensor signals from the respective channel, and outputs the received one or more sensor signals as one or more output voltages to the respective ADC. The ADC 135(1)-135(m) in each slice 145(1)-145(m) converts the one or more output voltages of the respective receiver into one or more digital values, and outputs the one or more digital values to the respective local memory. For example, each of the ADCs 135(1)-135(4) in subset 1310(1) outputs the respective one or more digital values to local memory 1315(1).

For each subset 1310(1)-1310(L), one of the PEs in the subset processes the digital values for the channels corresponding to the subset. For example, for subset 1310(1), one of the PEs 140(1)-140(4) in subset 1310(1) processes the digital values for channels 1312(1)-1312(4), which correspond to subset 1310(1).

For example, for each subset 1310(1)-1310(L), the one of the PEs in the subset may read the digital values for the channels corresponding to the subset from the respective local memory, and average the digital values to produce an average digital value. The PE may then compare the average value with the detection threshold, and generate a detection indicator if the average value is above the detection threshold. In this example, a detection indicator indicates detection of the user's finger on the channels corresponding to the subset. The detection indicator may be written to the respective local memory or another memory accessible by the controller 150.

The controller 150 may then look in the local memories or the other memory for any detection indicators. The controller 150 may take the touch-panel interface out of the low-power mode if the controller 150 finds one or more detection indicators.

Thus, in this example, one of the PEs in each subset performs digital processing on digital values from the channels corresponding to the subset to detect the presence of the user's finger. The remaining PEs in each subset may be disabled to conserve power. For example, for each subset, the power management architecture 1605 may include separate power gates for controlling power to the one of the PEs in the subset and the remaining PEs in the subset. In this example, for each subset, the power controller 1650 turns on the power gate for the one of the PEs in the subset and turns off the power gate for the remaining PEs in the subset to disable the remaining PEs in the subset.

In the above examples, the global memory 1320 and the processor 1330 are not utilized in the low-power mode to monitor the touch panel for the presence of the user's finger. Accordingly, the global memory 1320 and the processor 1330 may be disabled in the low-power mode to conserve power. In this example, the power controller 1650 and/or the controller 150 may disable the global memory 1320 and the processor 1330 by disabling the second clock gate 1640 and/or turning off the second power gate 1615.

Figure 17:
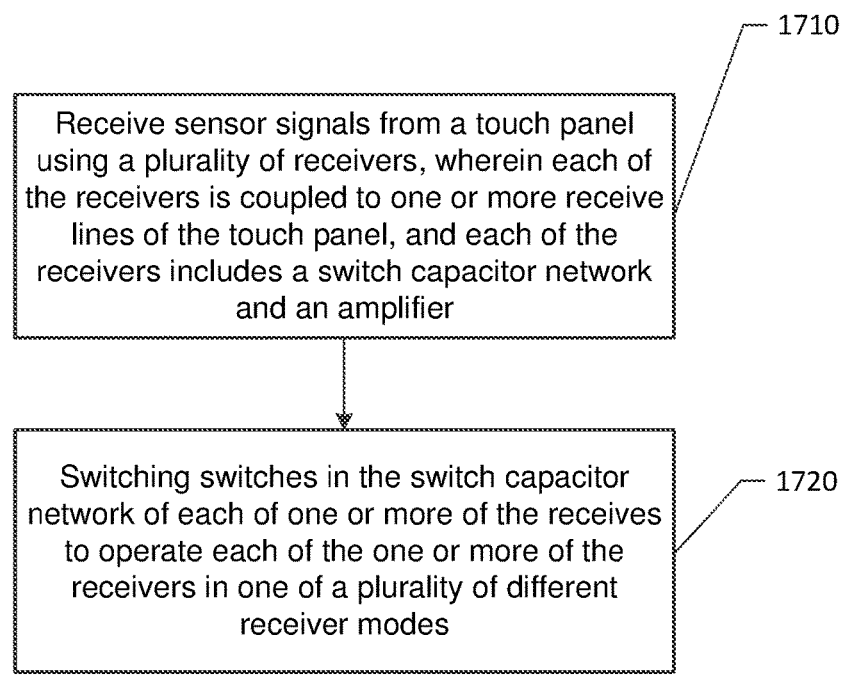
FIG. 17 is a flowchart showing an example of a method for touch-panel processing according to certain aspects of the present disclosure.

FIG. 17 illustrates a method 1700 for touch-panel processing according to aspects of the present disclosure. The method 1700 may be performed by the touch-panel interface 112 shown in FIG. 1.

At step 1710, sensor signals are received from a touch panel using a plurality of receivers, wherein each of the receivers is coupled to one or more receive lines of the touch panel, and each of the receivers includes a switch capacitor network and an amplifier. For example, the plurality of receivers may correspond to the receivers 120 shown in FIG. 1. Each of the receivers may be coupled to one receive line (e.g., for single-ended sensing) or two adjacent receive lines (e.g., for differential-ended sensing).

At step 1720, switches in the switch capacitor network of each of one or more of the receivers are switched to operate each of the one or more of the receivers in one of a plurality of different receiver modes. For example, the plurality of different receiver modes may include two or more of the following: a differential mutual-capacitance sensing mode, a single-ended mutual-capacitance sensing mode, a differential self-capacitance sensing mode, a single-ended self-capacitance sensing mode, and a charge amplifier mode. In one example, switches (e.g., switches shown in FIG. 3) in the switch capacitor network (e.g., switch capacitor network 124) are switched according to a switching sequence to operate the receiver in one of the above receiver modes. The switching sequence may include a sampling phase, a charge-transfer phase, and/or one or more additional phases.

Figure 18:
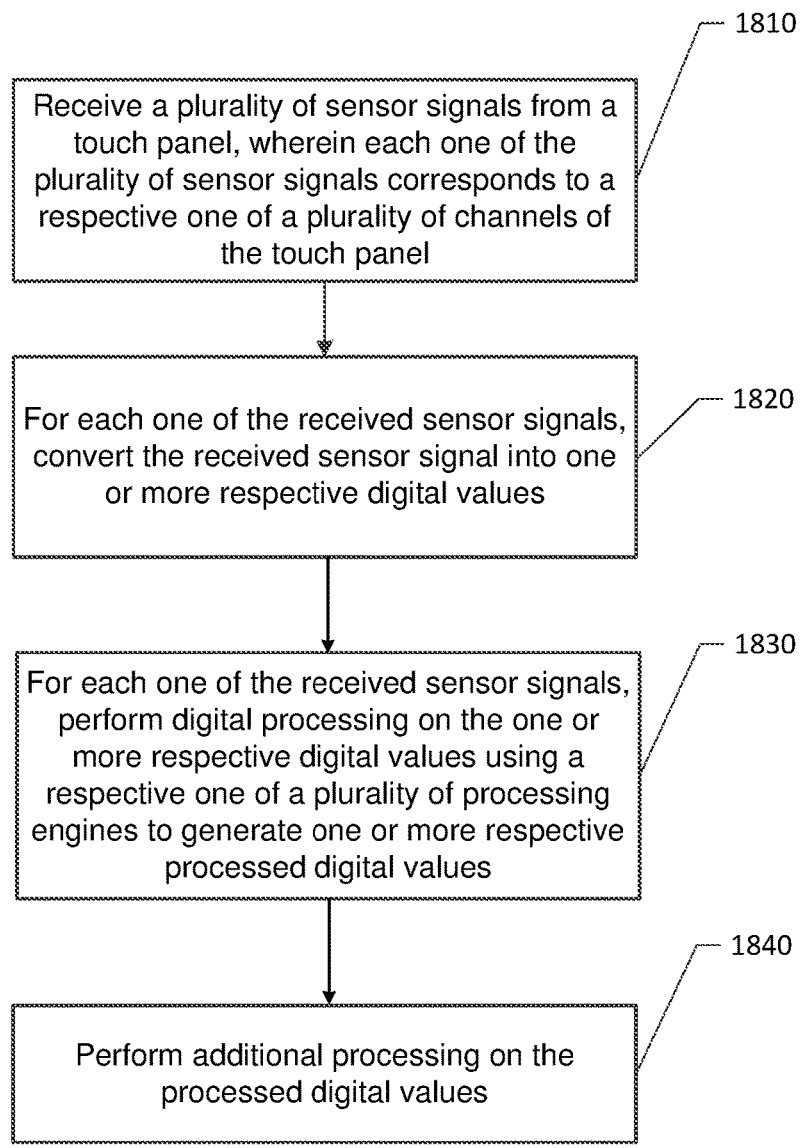
FIG. 18 is a flowchart showing another example of a method for touch-panel processing according to certain aspects of the present disclosure.

FIG. 18 illustrates another example of a method 1800 for touch-panel processing according to aspects of the present disclosure. The method 1800 may be performed by the processing architecture 1305.

At step 1810, a plurality of sensor signals is received from a touch panel, wherein each one of the plurality of sensor signals corresponds to a respective one of a plurality of channels of the touch panel. For example, each one of the plurality of channels of the touch panel may correspond to a respective receive line of the touch panel. In another example, each one of the plurality of channels of the touch panel may correspond to a respective pair of receive lines (e.g., adjacent receive lines) of the touch panel. In this example, the sensor signal for each channel may comprise two sensor signals on the respective pair of receive lines.

At step 1820, for each one of the received sensor signals, the received sensor signal is converted into one or more respective digital values. For example, the received sensor signal may be converted into the one or more respective digital values by a respective ADC (e.g., respective one of ADCs 135(1)-135(m)). The received sensor signal may be in the form of a voltage that is a function of one or more capacitances (e.g., mutual capacitances and/or self capacitances) of the touch panel, as discussed above.

At step 1830, for each one of the received sensor signals, digital processing is performed on the one or more respective digital values using a respective one of a plurality of processing engines to generate one or more respective processed digital values. The digital processing may include at least one of demodulation, Walsh decoding, averaging, or filtering. The plurality of processing engines may correspond to two or more of the PEs 140(1)-140(m).

At step 1840, additional processing is performed on the processed digital values. For example, the additional processing may be performed by a processor (e.g., processor 1340) and may include computing positions of multiple user fingers on the touch panel based on the received processed digital values.

It is to be appreciated that, although aspects of the present disclosure were discussed above using the example of a user's finger, the present disclosure is not limited to this example. For example, the present disclosure may be used to detect the presence of a stylus or another touch object.

Also, it is to be appreciated that the present disclosure is not limited to the particular terminology used above to describe aspects of the present disclosure. For example, a clock gate may also be referred to as a clock gating cell or another terminology, and a power gate may also be referred to as a power gating switch or another terminology.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two components.

It is to be understood that the present disclosure is not limited to the specific order or hierarchy of steps in the methods disclosed herein. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The steps of a method described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor. The processor and the storage medium may reside in a computing system.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A system, comprising:
a plurality of processing engines, wherein each one of the plurality of processing engines is configured to receive one or more respective digital values corresponding to a respective sensor signal from a respective one of a plurality of channels of a touch panel, and to perform digital processing on the one or more respective digital values to generate one or more respective processed digital values;
a controller configured to program the plurality of processing engines to perform the digital processing in parallel by inputting a set of instructions to each one of the plurality of processing engines; and
a processor configured to receive the processed digital values from the plurality of processing engines, and to perform additional processing on the received processed digital values.

2. The system of claim 1, wherein the digital processing performed by each one of the plurality of processing engines includes at least one of demodulation, Walsh decoding, averaging, or filtering.

3. The system of claim 2, wherein the additional processing performed by the processor includes computing positions of multiple user fingers on the touch panel based on the received processed digital values.

4. The system of claim 2, wherein each one of the plurality of processing engines comprises a respective arithmetic logic unit (ALU) configured to perform any one of a plurality of operations, and the set of instructions includes an operation instruction selecting one of the plurality of operations.

5. The system of claim 4, wherein the plurality of operations comprises at least one of addition, or subtraction.

6. The system of claim 1, wherein the digital processing performed by each one of the plurality of processing engines includes subtracting a respective digital baseline value from the one or more respective digital values.

7. The system of claim 1, wherein, for each one of the plurality of processing engines, the system further comprises:
- a respective receiver configured to receive the respective sensor signal from the touch panel; and
- a respective analog-to-digital converter (ADC) configured to convert the received respective sensor signal into the respective one or more digital values.

8. The system of claim 1, wherein each one of the plurality of channels of the touch panel corresponds to a respective receive line of the touch panel.

9. The system of claim 1, wherein each one of the plurality of channels of the touch panel corresponds to a respective pair of receive lines of the touch panel.

10. A system comprising:
- a plurality of receivers, wherein each one of the plurality of receivers is configured to receive a respective sensor signal from a touch panel;
- a plurality of analog-to-digital converters (ADCs), wherein each one of the plurality of ADCs is configured to convert the received sensor signal or a respective one of the plurality of ADCs into respective one or more digital values;
- a plurality of processing engines, wherein each one of the plurality of processing engines is configured to receive the one or more respective digital values from a respective one of the plurality of ADCs, and to perform digital processing on the one or more respective digital values to generate one or more respective processed digital values; and
- a controller configured to program each one of the plurality of processing engines to perform the digital processing; and
- a processor configured to receive the processed digital values from the plurality of processing engines, and to perform additional processing on the received processed digital values;
- wherein each one of the plurality of receivers includes a respective switch capacitor network and a respective amplifier, and wherein the controller is configured to control switches in the switch capacitor network of each one of the plurality of receivers to operate each one of the plurality of receivers in one of a plurality of different receiver modes.

11. The system of claim 10, wherein the plurality of different receiver modes includes two or more of the following: a differential mutual-capacitance sensing mode, a single-ended mutual-capacitance sensing mode, a differential self-capacitance sensing mode, a single-ended self-capacitance sensing mode, and a charge amplifier mode.

12. The system of claim 8, wherein the controller includes a decoder configured to receive a phase instruction specifying one or more node connections for the switch capacitor network of each one of the plurality of receivers, and to convert the phase instruction into a plurality of switch control signals that control the switches in the switch capacitor network of each one of the plurality of receivers to implement the one or more node connections specified by the phase instruction.

13. A method for touch-panel processing, comprising:
- receiving a plurality of sensor signals from a touch panel, wherein each one of the plurality of sensor signals corresponds to a respective one of a plurality of channels of the touch panel;
- for each one of the received sensor signals, converting the received sensor signal into one or more respective digital values;
- for each one of the received sensor signals, performing digital processing on the one or more respective digital values using a respective one of a plurality of processing engines to generate one or more respective processed digital values;
- performing additional processing on the processed digital values; and
- programming the plurality of processing engines to perform the digital processing in parallel, wherein programming the plurality of processing engines comprises inputting a set of instructions to each one of the plurality of processing engines.

14. The method of claim 13, wherein the digital processing performed for each one received sensor signals includes at least one of demodulation, Walsh decoding, averaging, or filtering.

15. The method of claim 14, wherein the additional processing performed on the processed digital values includes computing positions of multiple user fingers on the touch panel based on the received processed digital values.

16. The method of claim 14, wherein each one of the plurality of processing engines comprises a respective arithmetic logic unit (ALU) configured to perform any one of a plurality of operations, and the set of instructions includes an operation instruction selecting one of the plurality of operations.

17. The method of claim 16, wherein the plurality of operations comprises at least one of addition, or subtraction.

18. The method of claim 13, wherein performing the digital processing on the one or more respective digital values comprises subtracting a respective digital baseline value from the one or more respective digital values.

19. The method of claim 13, wherein each one of the plurality of channels of the touch panel corresponds to a respective receive line of the touch panel.

20. The method of claim 13, wherein each one of the plurality of channels of the touch panel corresponds to a respective pair of receive lines of the touch panel.

* * * * *